United States Patent [19]

Takeuchi

[11] Patent Number: 5,680,178
[45] Date of Patent: Oct. 21, 1997

[54] VIDEO MULTIPLEXING SYSTEM FOR SUPERIMPOSITION OF SCALABLE VIDEO DATA STREAMS UPON A BACKGROUND VIDEO DATA STREAM

[75] Inventor: Kesatoshi Takeuchi, Suwa, Japan

[73] Assignee: Seiko Epson Corporation, Tokyo, Japan

[21] Appl. No.: 452,012

[22] Filed: May 26, 1995

Related U.S. Application Data

[63] Continuation of Ser. No. 294,402, Aug. 23, 1994, Pat. No. 5,469,221, which is a continuation of Ser. No. 185,155, Jan. 24, 1994, Pat. No. 5,387,945, which is a continuation of Ser. No. 39,708, Mar. 31, 1993, which is a continuation of Ser. No. 873,322, Apr. 14, 1992, which is a continuation of Ser. No. 474,768, May 14, 1990, abandoned.

[30] Foreign Application Priority Data

| Jul. 13, 1988 | [JP] | Japan | 63-175948 |
| Dec. 28, 1988 | [JP] | Japan | 63-331874 |
| Dec. 28, 1988 | [JP] | Japan | 63-331875 |
| Dec. 28, 1988 | [JP] | Japan | 63-331876 |
| Dec. 28, 1988 | [JP] | Japan | 63-331878 |
| Feb. 7, 1989 | [JP] | Japan | 1-28430 |

[51] Int. Cl.$^6$ ........................... H04N 9/74
[52] U.S. Cl. ............ 348/581; 345/28; 345/127; 348/718; 348/564
[58] Field of Search ............ 348/445, 564, 348/581, 589, 718, 719, 500; 345/27, 28, 115, 127, 200; 395/102

[56] References Cited

U.S. PATENT DOCUMENTS

| 4,418,343 | 11/1983 | Ryan et al. | 345/27 |
| 4,511,965 | 4/1985 | Rajaran | 345/115 |
| 4,858,107 | 8/1989 | Fedede | 345/200 |
| 4,862,269 | 8/1989 | Sonoda et al. | 348/565 |
| 4,907,086 | 3/1990 | Truong | 348/586 |

FOREIGN PATENT DOCUMENTS

| 54-112122 | 9/1979 | Japan . |
| 54-148426 | 11/1979 | Japan . |
| 58-160983 | 9/1983 | Japan . |
| 60-206383 | 10/1985 | Japan . |
| 62-34280 | 2/1987 | Japan . |
| 62-104383 | 5/1987 | Japan . |
| 62-150982 | 7/1987 | Japan . |
| 62-180682 | 8/1987 | Japan . |
| 62-254578 | 11/1987 | Japan . |
| 63-35070 | 2/1988 | Japan . |

OTHER PUBLICATIONS

Sony CXK1206AM/ATM, Video Signal Field Memory, pp. 1–40 undated.

Primary Examiner—Victor R. Kostak
Attorney, Agent, or Firm—Oblon, Spivak, McClelland, Maier & Neustadt, P.C.

[57] ABSTRACT

A computer system which includes a microprocessor, a bus coupled to the microprocessor, a video memory coupled to the bus and a display device. A write controller is also provided which is coupled to the bus and which controls writing of an image signal into the video memory by supplying a write address to the video memory. The write controller operates to change a range of the write address according to a plurality of write address parameters set by the microprocessor so that a memory area of the video memory into which the image signal is to be written is changed according to the range of the write address. Further, a size of an image represented by the image signal to be written into the video memory is changed. A read controller is also provided and is coupled to the bus for controlling reading of an image signal out of the video memory by supplying a read address to the video memory asynchronously with the writing into the video memory, and in synchronism with the synchronizing signal supplied to the display device along with the image signal read out of the video memory.

8 Claims, 18 Drawing Sheets

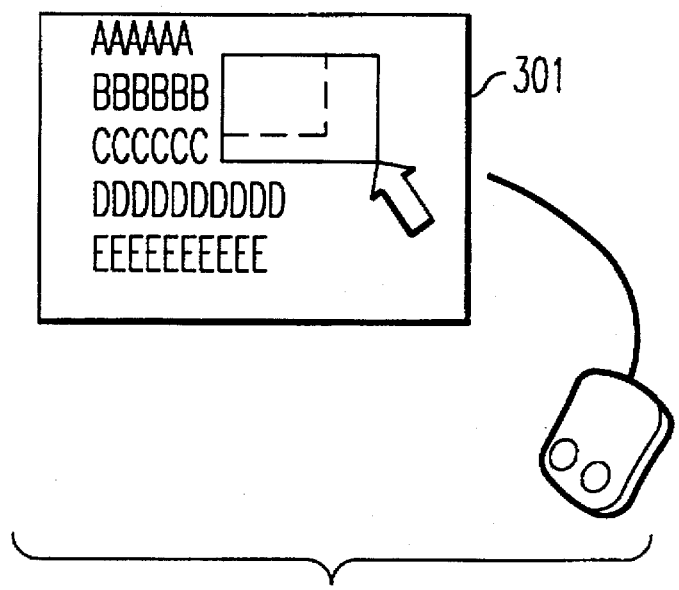
FIG. 6
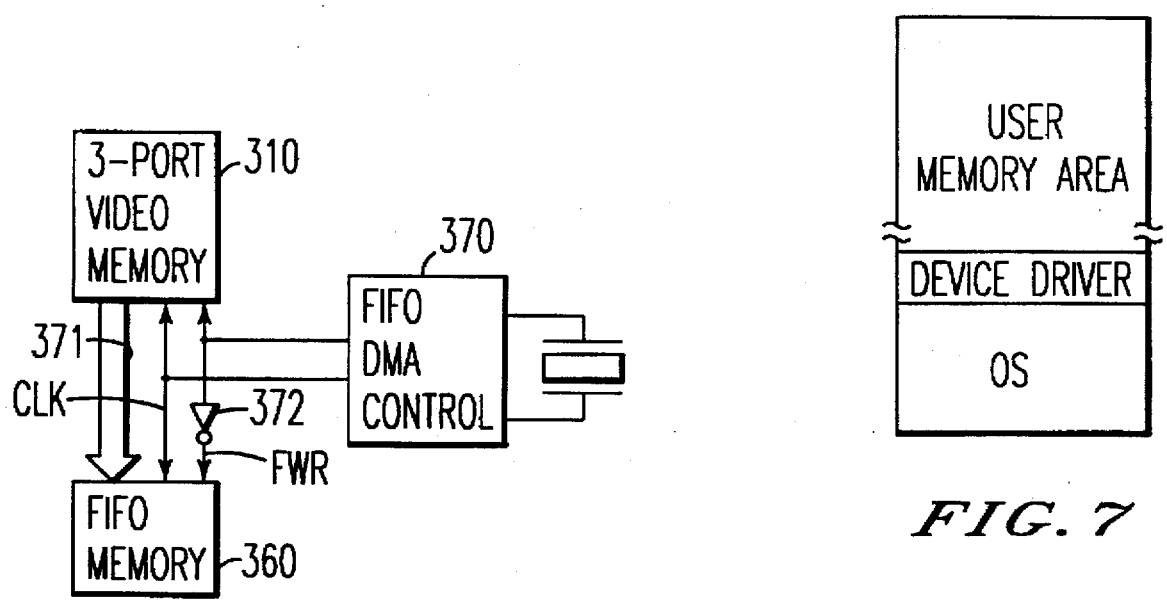
FIG. 10
FIG. 7

VIDEO MULTIPLEXING SYSTEM FOR SUPERIMPOSITION OF SCALABLE VIDEO DATA STREAMS UPON A BACKGROUND VIDEO DATA STREAM

This is a continuation of application Ser. No. 08/294,402 filed Aug. 23, 1994, now U.S. Pat. No. 5,469,221, which is a continuation of application Ser. No. 08/185,155 filed Jan. 24, 1994, now U.S. Pat. No. 5,387,945, which is a continuation of application Ser. No. 08/039,708 filed Mar. 31, 1993, which is a continuation of application Ser. No. 07/873,322 filed Apr. 14, 1992, which is a continuation of application Ser. No. 07/474,768 filed May 14, 1990, now abandoned, which was filed as PCT/JP89/00683 on Jul. 6, 1989.

[TECHNICAL FIELD]

The present invention relates to an image processing circuit in the monitor of a personal computer, an intelligent terminal, a TV telephone or a smart TV and, more particularly, to a process for processing an image to an arbitrary size and superposing

[BACKGROUND TECHNIQUE]

In the prior art, there is an image processing system which is enabled to operate a personal computer while observing a TV program by superimposing the picture of the TV with a predetermined size and in a predetermined position on the monitor frame of the personal computer.

FIG. 21 is a block diagram showing the image processing system of the prior art. In FIG. 21: reference numeral 100 designates a video decoder for separating a first video signal $VS_1$ into a first synchronizing signal $SS_1$ and a first luminance signal $LS_1$; numeral 200 designates an analog-digital converter (which will be shortly referred to as an "ADC") for digitizing the first luminance signal $LS_1$; numeral 300 designates a video memory for storing the digitized first luminance signal $LS_1$; numeral 340 designates a write control unit for controlling the writing of the first luminance signal $LS_1$ in the video memory 300; numeral 350 designates a read control unit for controlling the reading of the first luminance signal $LS_1$ out of the video memory 300; numeral 400 designates a digital-analog converter (which will be shortly referred to as a "DAC") for converting to analog the first luminance signal $LS_1$ read out from the video memory 300; numeral 600 designates a CPU control unit; numeral 630 designates a multiplexer; numeral 640 designates a video decoder unit for separating a third video signal $VS_3$ into a third synchronizing signal $SS_3$ and a third luminance signal $LS_3$; and numeral 500 designates a mixing control unit for mixing the first luminance signal $LS_1$ and the third luminance signal $LS_3$ to output a fourth luminance signal $LS_4$.

In this video processing circuit of the prior art, the video decoder 100 separates the video signal $VS_1$ into the synchronizing signal $SS_1$ and the luminance signal $LS_1$, and the ADC 200 digitizes and writes the luminance signal $LS_1$ in the video memory 300.

At this time, the write control unit 340 outputs a timing clock for controlling the operations of the ADC 200 and the video memory 300 on the basis of the synchronizing signal $SS_1$.

Here, the second luminance signal $LS_2$ outputted from the CPU control unit 600 can be written in the video memory 300.

Moreover, the read control unit 350 reads out the first luminance signal $LS_1$ (or the second luminance signal $LS_2$) written in the video memory 300 through the multiplexer 630. The DAC 400 converts to analog the first luminance signal $LS_1$ read out from the video memory 300. The mixing control unit 500 mixes the first luminance signal $LS_1$ and the third luminance signal $LS_3$ to output the fourth luminance signal $LS_4$ in which an image corresponding to the first luminance signal $LS_1$ is superimposed on the image corresponding to the third luminance signal $LS_3$.

For a still image, on the other hand, a CPU 620 monitors the operations of the video decoder unit 100. If this video decoder unit 100 outputs a vertical synchronizing signal, the CPU 620 interrupts the digitize control by the ADC 200 during the vertical blanking period in the video signal.

In this still image, too, there can be obtained the fourth luminance signal $LS_4$ in which the image corresponding to the first luminance signal $LS_1$ is superimposed upon the image corresponding to the third luminance signal $LS_3$.

When, moreover, letters or special shapes are to be superimposed upon the image corresponding to the first luminance signal $LS_1$, the CPU control unit 600 writes the shape data of the letters or special shapes in the video memory 300.

Here, the image processing system of the prior art, as shown in FIG. 21, is troubled by a problem that it cannot cope in the least with the multi-purpose specifications such as the display by an arbitrary resolution corresponding to a smart image to be developed in the near future, the conversion of an arbitrary aspect ratio, the control of display in an arbitrary position, or the superimpose.

For the multi-purpose specifications, moreover, the price for the system rises as high as several hundreds to thousands yens as in the TV broadcasting system used at present in the commercial broadcasting stations.

This raises a problem that fundamental technical innovations are required for the level of the home appliances.

Generally speaking, on the other hand, the video memory 300 has to be refreshed because it is constructed of a dynamic memory.

For this necessity, a clock signal for refreshing the video memory 300 is fed to the serial ports of the video memory 300. This clock signal has a frequency of 10 (MHz) or more, for example.

In case, therefore, the serial output at the side of the multiplexer 630 has a clock of several hundreds (KHz) to several (MHz), a frequency of 10 (MHz) or more has to be supplied from the aforementioned serial output other than that at the side of the DAC 400.

This serial output other than that at the side of the DAC 400 has to be merely the refreshing clock aiming at no output.

If the video data of the video memory 300 is to be read out by the CPU control unit 600, the multiplexer 630 has to be switched to read out the video data from the CPU control 600 so that the video data are not sent to the DAC 400. This raises another problem that the image coming from the DAC 400 becomes the fourth luminance signal $LS_4$ in the blanked state even if it is superimposed upon the third luminance signal $LS_3$.

Still another problem is that it is impossible for the CPU to read the CPU control 600 by the operations always having a frequency of 10 (MHz) or more than that of the aforementioned serial output other than that at the side of the DAC 400.

For the still image, moreover, the CPU control unit 600 has to monitor the a vertical synchronizing signal $VS_1$ thereby to raise a further problem that the CPU control unit 600 has to require a standby time of several tens mS in the worst case.

Even if, moreover, the CPU control unit 600 is equipped with a high-speed IC such as a digital signal processor (which is called the "DSP"), it takes several tens (μs) to rewrite the letters or special shapes.

In case, on the other hand, the third luminance signal $LS_3$ is related to one corresponding to a motion picture, there is required a time period for reducing the frame number of the third luminance signal $LS_3$ and to rewrite the stored content of the video memory 300 by the CPU 620.

It is impossible to scroll the letters or special shapes vertically and horizontally in the third luminance signal $LS_3$.

[DISCLOSURE OF THE INVENTION]

The present invention has been conceived to solve the above-specified problems and has an object to provide an image processing system for achieving the following objects:

(1) to realize an arbitrary resolution of the image, an arbitrary area designation; a location of an arbitrary memory or a conversion to an arbitrary aspect ratio easily at the level of home appliances;

(2) to read out the luminance signals of the video memory easily from a control system of irregular time such as the CPU without any interruption of the monitor output function of the video memory;

(3) to eliminate any necessary for the standby for the still image by the CPU control unit 600;

(4) to rewrite the displayed content in real time on the superimposed display frame; and (5) to realize the above-specified functions at the price at the level of the home appliances.

According a first mode of the present invention, there is provided an image processing system comprising: decode means for separating a first video signal into a first luminance signal, a first horizontal synchronizing signal and a first vertical synchronizing signal; analog-digital conversion means for digitizing said first luminance signal; memory means for storing the digitized first luminance signal; digital-analog conversion means for reading and analogly converting the luminance signal stored by said memory means; mixing means for either the luminance signal read out and analogly converted by said memory means or a second luminance signal selectively as a third luminance signal; and control means for outputting control signals to control said decode means, said analog-digital conversion means, said memory means, said digital-analog conversion means and said mixing means.

In a second mode of the present invention, said analog-digital conversion means, said memory means, said digital-analog conversion means, said mixing means and said control means are constructed on a extended slot card.

In a third mode of the present invention, said control means includes: operation means for inputting the position, size and timing for displaying an image corresponding to said first luminance signal to an image corresponding to said third luminance signal; and a device driver disposed in an operating system for outputting the signals corresponding to the position, size and timing, which are to be inputted by said operating means, to said decode means, said memory means, said digital-analog conversion means and mixing means.

According to a fourth mode of the present invention, said memory means includes a video memory for storing the first luminance signal, which is digitized by said analog-digital conversion means, in an area of the address, which is specified by a write shift signal and a write line increment signal, when a write enable signal is outputted, such that a horizontal address is reset by a horizontal write clear signal whereas a vertical address is reset by a vertical write clear signal, when said first luminance signal is to be written, so that said horizontal address is set at the unit of a block of a predetermined dot number by an address signal and incremented by said write shift signal and so that said vertical address is incremented by said write increment signal, and said analog-digital conversion means includes: an analog-digital conversion circuit for analog-digital converting said first luminance signal; a horizontal write dot clock generator synchronized with said first horizontal synchronizing signal for outputting a horizontal write dot clock signal having a frequency predetermined times as high as that of said first horizontal synchronizing signal and based upon said block unit as the analog-digital conversion clock signal of said analog-digital conversion means and a basic synchronizing signal having a predetermined frequency as said write shift signal; a horizontal write starting counter reset by said first horizontal synchronizing signal for counting the clock number of said horizontal write dot clock signal to output a horizontal write starting signal for starting the writing of said first luminance signal in said image memory and said horizontal write clear signal when said counted value reaches a preset value; a horizontal write number counter reset by said first horizontal synchronizing signal for counting the clock number of said horizontal write dot clock signal, after the output of said horizontal write starting signal, to output a horizontal write number signal for inhibiting the write of said first luminance signal in said video memory when said counted value reaches a predetermined value; a vertical write offset counter reset by said first vertical synchronizing signal for outputting a vertical write offset signal of the clock number of the preset value, which is synchronized with said basic synchronous signal, as said write line increment signal; a vertical write line clock generator synchronized with said first vertical synchronizing signal for outputting a vertical write line clock signal having a frequency of predetermined times as high as that of said vertical synchronizing signal as said write line increment signal; a vertical write starting counter reset by said first vertical synchronizing signal for counting the clock number of said first horizontal synchronizing signal to output a vertical write starting signal for starting the writing of said luminance signal in said video memory when said counted value reaches a preset value; a vertical write number counter reset by said vertical synchronizing signal for starting the counting of the clock number of said vertical write line clock signal, after the output of said vertical write starting signal, to output a vertical write number signal for inhibiting the writing of said first luminance signal in said video memory when said counted value reaches a preset value; and write control means for outputting said write enable signal on the basis of said first vertical synchronizing signal, said horizontal write clear signal, said horizontal write dot clock signal, said horizontal write starting signal, said horizontal write number signal, said vertical write starting signal, said vertical write number signal and said vertical write line clock signal to write the first luminance signal, which is digitized by said horizontal write dot clock signal, in the area of said video memory, which is specified by said address signal, said write shift signal and said write line increment signal, while said horizontal write starting signal and said vertical write starting signal are being outputted.

In a fifth mode of the present invention, said control means sets the value of said block, the frequency of said vertical write line clock signal, the preset value of said horizontal write starting counter, the preset value of said horizontal write number counter, the preset value of said vertical write starting counter and the preset value of said vertical write number counter.

In a sixth mode of the present invention, said control means includes image still means for outputting said first vertical synchronizing signal none of said video memory, said vertical write offset counter, said vertical write line clock generator, said vertical write starting counter and said vertical write number counter in accordance with the operations of said operation means.

In a seventh mode of the present invention, said memory means includes: a write control unit for controlling said video memory when said control means writes said second luminance signal in said video memory; luminance signal selecting means for outputting said first luminance signal and said second luminance signal selectively to said video memory; and a video memory control signal selecting unit for outputting a write control signal of said first luminance signal and a write control signal of said second luminance signal in a manner to correspond to the selected output of said first luminance signal and said second luminance signal.

In an eighth mode of the present invention, said memory means includes: an FIFO memory of first-in first-out type having at least a storage capacity equal to or more than that of said video memory for writing and reading said luminance signals asynchronously in and out of said video memory; a read control unit for controlling the reading of said luminance signal in said FIFO memory out of said video memory in accordance with the control of said control means; and an FIFO read control unit for controlling said FIFO memory.

In a ninth mode of the present invention, said video memory reads out said luminance signal from the address, which is specified by a read shift signal and a read line increment signal of said video memory, when a read enable signal is outputted, such that the horizontal address reset by said horizontal read clear signal whereas the vertical address is reset by the vertical read clear signal or said third vertical synchronizing signal, when said luminance signal stored in said video memory is to be read out, so that said horizontal address is incremented by said read shift signal whereas said vertical address is incremented by said read line increment signal, said digital-analog conversion means includes: a digital-analog conversion circuit for analogly converting and outputting the luminance signal which is read out from said video memory; a horizontal reference read dot clock generator for outputting a horizontal reference read dot clock signal synchronized with said third horizontal synchronizing signal; a first horizontal read starting counter reset by said third horizontal synchronizing signal for counting the clock number of said horizontal reference read dot clock signal to output a first horizontal read starting signal for starting the reading of said luminance signal from said video memory and a horizontal read reset signal as said horizontal read clear signal when said counted value reaches a preset value; a second horizontal read starting counter reset by said third horizontal synchronizing signal for counting the clock number of said horizontal reference read dot clock signal, after the output of said first horizontal read starting signal, to output the second horizontal read starting signal when said counted value reaches a predetermined value; a horizontal read number counter reset by said third horizontal synchronizing signal for counting the clock number of said horizontal reference read dot clock signal to inhibit the reading of the luminance signal, which is stored in said video memory, when said counted value reaches a preset value; a horizontal read dot clock generator for outputting a horizontal read dot clock signal synchronized with said third horizontal synchronizing signal; a vertical read offset counter reset by said third vertical synchronizing signal for outputting the vertical read offset signal as said vertical line increment signal on the basis of said horizontal reference read dot clock signal; a vertical blanking number counter reset by said third vertical synchronizing signal for counting the clock number of said third horizontal synchronizing signal to output a vertical blanking ending signal when said counted value indicates that a vertical back porch region has been passed; a vertical read starting counter reset by said third vertical synchronizing signal for counting the clock number of said third horizontal synchronizing signal, after the output of said vertical blanking ending signal, to output a vertical read starting signal for starting the reading the luminance signal from said video signal when said counted value reaches a preset value; a vertical read number counter reset by said third vertical synchronizing signal for counting the clock number of said third horizontal synchronizing signal, after the output of said vertical read starting signal, to output a vertical read number signal for inhibiting the reading of the luminance signal from said video memory, when said counted value reaches a preset value; a vertical read line clock generator for outputting the vertical read line clock signal, which is synchronized with said third vertical synchronizing signal, as said vertical line increment signal; a superimpose start signal output circuit for outputting a superimpose starting signal on the basis of said second horizontal read starting signal, said horizontal read number signal, said vertical read starting signal and said vertical read number signal; and a read enable signal output circuit for outputting said read enable signal on the basis of said third vertical synchronizing signal, said horizontal read reset signal, said vertical read line clock signal and said superimpose starting signal to read out the luminance signal from the area of said video memory, which is specified by either said horizontal reference read dot clock signal or said horizontal read dot clock signal and said read line increment signal, and said mixing means includes a video switch switched on the basis of said superimpose starting signal for selectively outputting the luminance signal, which is read out from said video memory and analogly converted by said digital-analog conversion circuit, and said third luminance signal.

In a tenth mode of the present invention, said horizontal reference read dot clock generator constructing the ninth mode of the present invention includes a PLL circuit for outputting a signal having a frequency several tens to thousands as high as that of said third horizontal synchronizing signal, said horizontal read dot clock generator includes a PLL circuit for outputting a signal having a frequency a predetermined number of times as high as that of said third horizontal synchronizing signal, and said vertical read line clock generator includes a PLL circuit for outputting a signal having a frequency a predetermined number of times as high as that of said third vertical synchronizing signal.

In an eleventh mode of the present invention, said control means constructing the tenth mode of the present invention sets the individual clock numbers which are counted by said first horizontal read starting counter, said horizontal read number counter, said vertical blanking number counter, said vertical read starting counter and said vertical read number counter.

In a twelfth mode of the present invention, said video memory reads out said luminance signal from the address, which is specified by a read shift signal and a read line increment signal of said video memory, when a read enable signal is outputted, such that the horizontal address reset by said horizontal read clear signal whereas the vertical address is reset by the vertical read clear signal or said third vertical synchronizing signal, when said luminance signal stored in said video memory is to be read out, so that said horizontal address is incremented by said read shift signal whereas said vertical address is incremented by said read line increment signal, said digital-analog conversion means includes: a digital-analog conversion circuit for analogly converting and .outputting the luminance signal which is read out from said video memory; a horizontal reference read dot clock generator for outputting a horizontal reference read dot clock signal synchronized with said third horizontal synchronizing signal; a first horizontal read starting counter reset by said third horizontal synchronizing signal for counting the clock number of said horizontal reference read dot clock signal to output a first horizontal read starting signal for starting the reading of said luminance signal from said video memory and a horizontal read reset signal as said horizontal read clear signal when said counted value reaches a preset value; a second horizontal read starting counter reset by said third horizontal synchronizing signal for counting the clock number of said horizontal reference read dot clock signal, after the output of said first horizontal read starting signal, to output the second horizontal read starting signal when said counted value reaches a predetermined value; a horizontal read number counter reset by said third horizontal synchronizing signal for counting the clock number of said horizontal reference read dot clock signal to inhibit the reading of the luminance signal, which is stored in said video memory, when said counted value reaches a preset value; a horizontal read dot clock generator for outputting a horizontal read dot clock signal synchronized with said third horizontal synchronizing signal; a vertical read offset counter reset by said third vertical synchronizing signal for outputting the vertical read offset signal as said vertical line increment signal on the basis of said horizontal reference read dot clock signal; a vertical blanking number counter reset by said third vertical synchronizing signal for counting the clock number of said third horizontal synchronizing signal to output a vertical blanking ending signal when said counted value indicates that a vertical back porch region has been passed; a vertical read starting counter reset by said third vertical synchronizing signal for counting the clock number of said third horizontal synchronizing signal, after the output of said vertical blanking ending signal, to output a vertical read starting signal for starting the reading the luminance signal from said video signal when said counted value reaches a preset value; a vertical read number counter reset by said third vertical synchronizing signal for counting the clock number of said third horizontal synchronizing signal, after the output of said vertical read starting signal, to output a vertical read number signal for inhibiting the reading of the luminance signal from said video memory, when said counted value reaches a preset value; a vertical read line clock generator for outputting the vertical read line clock signal, which is synchronized with said third vertical synchronizing signal, as said vertical line increment signal; a superimpose start signal output circuit for outputting a superimpose starting signal on the basis of said second horizontal read starting signal, said horizontal read number signal, said vertical read starting signal and said vertical read number signal; and a read enable signal output circuit for outputting said read enable signal on the basis of said third vertical synchronizing signal, said horizontal read reset signal, said vertical read line clock signal and said superimpose starting signal to read out the luminance signal from the area of said video memory, which is specified by either said horizontal reference read dot clock signal or said horizontal read dot clock signal and said read line increment signal, and said mixing means includes: comparator means for comparing said third luminance signal and a predetermined reference signal; compared output starting signal output means for outputting a compared output starting signal for starting the output of the compared output of said comparator means; superimpose control means for outputting a first superimpose starting signal for starting the superimpose of the first luminance signal, which is read out from said video memory and analogly converted by said digital-analog converter, upon said third luminance signal and a second superimpose starting signal for starting the superimpose of said third luminance signal upon said first luminance signal; and superimpose control means for superimposing said third luminance signal upon the first luminance signal, which is superimposed upon said third luminance signal, on the basis of the compared output of said comparator means, said first superimpose starting signal and said second superimpose starting signal.

In a thirteenth mode of the present invention, said horizontal reference read dot clock generator constructing the twelfth mode of the present invention includes a PLL circuit for outputting a signal having a frequency several tens to thousands as high as that of said third horizontal synchronizing signal, said horizontal read dot clock generator includes a PLL circuit for outputting a signal having a frequency a predetermined number of times as high as that of said third horizontal synchronizing signal, and said vertical read line clock generator includes a PLL circuit for outputting a signal having a frequency a predetermined number of times as high as that of said third vertical synchronizing signal.

In a fourteenth mode of the present invention, said control means constructing the thirteenth mode of the present invention sets the individual clock numbers which are counted by said first horizontal read starting counter, said horizontal read number counter, said vertical blanking number counter, said vertical read starting counter and said vertical read number counter.

According to a fifteenth mode of the present invention, there is provided a digitize control system comprising: an analog-digital conversion circuit for analog-digital converting said first luminance signal; a video memory for storing the first luminance signal, which is digitized by said analog-digital conversion means, in an area of the address, which is specified by a write shift signal and a write line increment signal, when a write enable signal is outputted, such that a horizontal address is reset by a horizontal write clear signal whereas a vertical address is reset by a vertical write clear signal, when said first luminance signal is to be written, so that said horizontal address is set at the unit of a block of a predetermined dot number by an address signal and incremented by said write shift signal and so that said vertical address is incremented by said write increment signal; a horizontal write dot clock generator synchronized with said first horizontal synchronizing signal for outputting a horizontal write dot clock signal having a frequency predetermined times as high as that of said first horizontal synchronizing signal and based upon said block unit as the analog-digital conversion clock signal of said analog-digital conversion means and a basic synchronizing signal having a predetermined frequency as said write shift signal; a horizontal write starting counter reset by said first horizontal synchronizing signal for counting the clock number of said horizontal write dot clock signal to output a horizontal write starting signal for starting the writing of said first luminance signal in said image memory and said horizontal write clear signal when said counted value reaches a preset value; a horizontal write number counter reset by said first horizontal synchronizing signal for counting the clock number of said horizontal write dot clock signal, after the output of said horizontal write starting signal, to output a horizontal write number signal for inhibiting the write of said first luminance signal in said video memory when said counted value reaches a predetermined value; a vertical write offset counter reset by said first vertical synchronizing signal for outputting a vertical write offset signal of the clock number of the preset value, which is synchronized with said basic synchronous signal, as said write line increment signal; a vertical write line clock generator synchronized with said first vertical synchronizing signal for outputting a vertical write line clock signal having a frequency of predetermined times as high as that of said vertical synchronizing signal as said write line increment signal; a vertical write starting counter reset by said first vertical synchronizing signal for counting the clock number of said first horizontal synchronizing signal to output a vertical write starting signal for starting the writing of said luminance signal in said video memory when said counted value reaches a preset value; a vertical write number counter reset by said vertical synchronizing signal for starting the counting of the clock number of said vertical write line clock signal, after the output of said vertical write starting signal, to output a vertical write number signal for inhibiting the writing of said first luminance signal in said video memory when said counted value reaches a preset value; and write control means for outputting said write enable signal on the basis of said first vertical synchronizing signal, said horizontal write clear signal, said horizontal write dot clock signal, said horizontal write starting signal, said horizontal write number signal, said vertical write starting signal, said vertical write number signal and said vertical write line clock signal to write the first luminance signal, which is digitized by said horizontal write dot clock signal, in the area of said video memory, which is specified by said address signal, said write shift signal and said write line increment signal, while said horizontal write starting signal and said vertical write starting signal are being outputted.

In a sixteen mode of the present invention, said digitize control system includes digitize control means sets the value of said block, the frequency of said vertical write line clock signal, the preset value of said horizontal write starting counter, the preset value of said horizontal write number counter, the preset value of said vertical write starting counter and the preset value of said vertical write number counter.

In a seventh mode of the present invention, said write control means includes image still means for outputting said first vertical synchronizing signal none of said video memory, said vertical write offset counter, said vertical write line clock generator, said vertical write starting counter and said vertical write number counter in accordance with the operations of said operation means.

In an eighteenth mode of the present invention, there is provided a superimpose control system comprising: a video memory storing a luminance signal for reading out said luminance signal from the address, which is specified by a read shift signal and a read line increment signal of said video memory, when a read enable signal is outputted, such that the horizontal address reset by said horizontal read clear signal whereas the vertical address is reset by the vertical read clear signal or a vertical synchronizing signal, so that said horizontal address is incremented by said read shift signal whereas said vertical address is incremented by said read line increment signal; a digital-analog conversion circuit for analogly converting and outputting the luminance signal which is read out from said video memory; a horizontal reference read dot clock generator for outputting a horizontal reference read dot clock signal synchronized with said horizontal synchronizing signal; a first horizontal read starting counter reset by said horizontal synchronizing signal for counting the clock number of said horizontal reference read dot clock signal to output a first horizontal read starting signal for starting the reading of said luminance signal from said video memory and a horizontal read reset signal as said horizontal read clear signal when said counted value reaches a preset value; a second horizontal read starting counter reset by said horizontal synchronizing signal for counting the clock number of said horizontal reference read dot clock signal, after the output of said first horizontal read starting signal, to output the second horizontal read starting signal when said counted value reaches a predetermined value; a horizontal read number counter reset by said horizontal synchronizing signal for counting the clock number of said horizontal reference read dot clock signal to inhibit the reading of the luminance signal, which is stored in said video memory, when said counted value reaches a preset value; a horizontal read dot clock generator for outputting a horizontal read clock signal synchronized with said horizontal synchronizing signal; a vertical read offset counter reset by said vertical synchronizing, signal for outputting the vertical read offset signal as said vertical line increment signal on the basis of said horizontal reference read dot clock signal; a vertical blanking number counter reset by said vertical synchronizing signal for counting the clock number of said horizontal synchronizing signal to output a vertical blanking ending signal when said counted value indicates that a vertical back porch region has been passed; a vertical read starting counter reset by said vertical synchronizing signal for counting the clock number of said horizontal synchronizing signal, after the output of said vertical blanking ending signal, to output a vertical read starting signal for starting the reading the luminance signal from said video signal when said counted value reaches a preset value; a vertical read number counter reset by said vertical synchronizing signal for counting the clock number of said horizontal synchronizing signal, after the output of said vertical read starting signal, to output a vertical read number signal for inhibiting the reading of the luminance signal from said video memory, when said counted value reaches a preset value; a vertical read line clock generator for outputting the vertical read line clock signal, which is synchronized with said vertical synchronizing signal, as said vertical line increment signal; a superimpose start signal output circuit for outputting a superimpose starting signal on the basis of said second horizontal read starting signal, said horizontal read number signal, said vertical read starting signal and said vertical read number signal; a read enable signal output circuit for outputting said read enable signal on the basis of said vertical synchronizing signal, said horizontal read reset signal, said vertical read line clock signal and said superimpose starting signal to read out the luminance signal from the area of said video memory, which is specified by either said horizontal reference read dot clock signal or said horizontal read dot clock signal and said read line increment signal; and a video switch switched on the basis of said superimpose starting signal for selectively outputting the luminance signal, which is read out from said video memory and analogly converted by said digital-analog conversion circuit, and said luminance signal.

In a nineteenth mode of the present invention, said horizontal reference read dot clock generator constructing the eighteenth mode of the present invention includes a PLL circuit for outputting a signal having a frequency several hundreds as high as that of said third horizontal synchronizing signal, said horizontal read dot clock generator includes a PLL circuit for outputting a signal having a frequency a predetermined number of times as high as that of said third horizontal synchronizing signal, and said vertical read line clock generator includes a PLL circuit for outputting a signal having a frequency a predetermined number of times as high as that of said third vertical synchronizing signal.

In a twelfth mode of the present invention, said superimpose control system further comprises control means for setting the individual clock numbers which are counted by said first horizontal read starting counter, said horizontal read number counter, said vertical blanking number counter, said vertical read starting counter and said vertical read number counter.

In a twenty first mode of the present invention, there is provided a superimpose control system comprising: a video memory storing a luminance signal for reading out said luminance signal from the address, which is specified by a read shift signal and a read line increment signal of said video memory, when a read enable signal is outputted, such that the horizontal address reset by said horizontal read clear signal whereas the vertical address is reset by the vertical read clear signal or a vertical synchronizing signal, so that said horizontal address is incremented by said read shift signal whereas said vertical address is incremented by said read line increment signal; a digital-analog conversion circuit for analogly converting and outputting the luminance signal which is read out from said video memory; a horizontal reference read dot clock generator for outputting a horizontal reference read dot clock signal synchronized with said horizontal synchronizing signal; a first horizontal read starting counter reset by said horizontal synchronizing signal for counting the clock number of said horizontal reference read dot clock signal to output a first horizontal read starting signal for starting the reading of said luminance signal from said video memory and a horizontal read reset signal as said horizontal read clear signal when said counted value reaches a preset value; a second horizontal read starting counter reset by said horizontal synchronizing signal for counting the clock number of said horizontal reference read dot clock signal, after the output of said first horizontal read starting signal, to output the second horizontal read starting signal when said counted value reaches a predetermined value; a horizontal read number counter reset by said horizontal synchronizing signal for counting the clock number of said horizontal reference read dot clock signal to inhibit the reading of the luminance signal, which is stored in said video memory, when said counted value reaches a preset value; a horizontal read dot clock generator for outputting a horizontal read dot clock signal synchronized with said horizontal synchronizing signal; a vertical read offset counter reset by said vertical synchronizing signal for outputting the vertical read offset signal as said vertical line increment signal on the basis of said horizontal reference read dot clock signal; a vertical blanking number counter reset by said vertical synchronizing signal for counting the clock number of said horizontal synchronizing signal to output a vertical blanking ending signal when said counted value indicates that a vertical back porch region has been passed; a vertical read starting counter reset by said vertical synchronizing signal for counting the clock number of said horizontal synchronizing signal, after the output of said vertical blanking ending signal, to output a vertical read starting signal for starting the reading the luminance signal from said video signal when said counted value reaches a preset value; a vertical read number counter reset by said vertical synchronizing signal for counting the clock number of said horizontal synchronizing signal, after the output of said vertical read starting signal, to output a vertical read number signal for inhibiting the reading of the luminance signal from said video memory, when said counted value reaches a preset value; a vertical read line clock generator for outputting the vertical read line clock signal, which is synchronized with said vertical synchronizing signal, as said vertical line increment signal; a superimpose start signal output circuit for outputting a superimpose starting signal on the basis of said second horizontal read starting signal, said horizontal read number signal, said vertical read starting signal and said vertical read number signal; a read enable signal output circuit for outputting said read enable signal on the basis of said vertical synchronizing signal, said horizontal read reset signal, said vertical read line clock signal and said superimpose starting signal to read out the luminance signal from the area of said video memory, which is specified by either said horizontal reference read dot clock signal or said horizontal read dot clock signal and said read line increment signal; comparator means for comparing said third luminance signal and a predetermined reference signal;

compared output starting signal output means for outputting a compared output starting signal for starting the output of the compared output of said comparator means; superimpose control means for outputting a first superimpose starting signal for starting the superimpose of the first luminance signal, which is read out from said video memory and analogly converted by said digital-analog converter, upon said third luminance signal and a second superimpose starting signal for starting the superimpose of said third luminance signal upon said first luminance signal; and superimpose control means for superimposing said third luminance signal upon the first luminance signal, which is superimposed upon said third luminance signal, on the basis of the compared output of said comparator means, said first superimpose starting signal and said second superimpose starting signal.

In a twenty second mode of the present invention, said horizontal reference read dot clock generator of the twenty first mode of the present invention includes a PLL circuit for outputting a signal having a frequency several hundreds as high as that of said third horizontal synchronizing signal, said horizontal read dot clock generator includes a PLL circuit for outputting a signal having a frequency a predetermined number of times as high as that of said third horizontal synchronizing signal, and said vertical read line clock generator includes a PLL circuit for outputting a signal having a frequency a predetermined number of times as high as that of said third vertical synchronizing signal.

In a twenty third mode of the present invention, said superimpose control system further comprises control means for setting the individual clock numbers which are counted by said first horizontal read starting counter, said horizontal read number counter, said vertical blanking number counter, said vertical read starting counter and said vertical read number counter.

According to the first mode of the present invention thus constructed, the decoding means separates the first video signal into the first luminance signal, the first horizontal synchronizing signal and the first vertical synchronizing signal and analog-digital converts them, and the memory means stores the digitized first luminance signal.

Moreover, the digital-analog conversion means converts the digitized luminance signal stored in the memory means to analog, and the mixing means reads it out from the memory means so that either the analogly converted luminance signal or the second luminance signal is selectively outputted as the third luminance signal.

The aforementioned operations are controlled by the control means.

According to the second mode of the present invention thus constructed, moreover, the decoding means, the analog-digital conversion means, the memory means, the digital-analog conversion means, the mixing means and the control means constructing the first mode of the present invention are constructed over the one extended slot card.

According to the third mode of the present invention thus constructed, furthermore, the operation means inputs the position, size and timing of displaying the image corresponding to the first luminance signal with respect to the image corresponding to the third luminance signal. Then, the signal corresponding to the position, size and timing inputted to the device drive in the OS is outputted to the decode means, the memory means, the digital-analog conversion means and the mixing means.

According to the fourth mode of the present invention thus constructed, furthermore, the write enable signal is outputted on the basis of the first vertical synchronizing signal, the horizontal write clear signal, the horizontal write dot clock signal, the horizontal write starting signal, the horizontal write number signal, the vertical write starting signal, the vertical write number signal and the vertical write line clock signal. While the horizontal write starting signal and the vertical write starting signal are being outputted, the first luminance signal, which is digitized by the horizontal write dot clock signal, is written in the area of the video memory, which is specified by the address signal, the write shift signal and the write line increment signal.

According to the fifth mode of the present invention thus constructed, furthermore, when the operations of the fourth mode of the present invention are to be accomplished, the control means sets the value of the block, the frequency of the vertical write line clock signal, the preset value of the horizontal write starting counter, the preset value of the horizontal write number counter, the preset value of the vertical write starting counter, and the preset value of the vertical write number counter.

According to the sixth mode of the present invention thus constructed, furthermore, the still image means does not output the first vertical synchronizing signal to the video memory, the vertical write offset counter, the vertical write line clock generator, the vertical write starting counter and the vertical write number counter in accordance with the operations of the operation means.

According to the seventh mode of the present invention thus constructed, when the write control unit writes the second luminance signal in the video memory, the write control means controls the video memory. Then, the luminance signal selection means outputs the first luminance signal and the second luminance signal selectively to the video memory. The video memory control signal selection unit outputs the write control signals of the first luminance signal and the second luminance signal selectively in response to the selected output of the first and second luminance signals.

According to the eighth mode of the present invention thus constructed, furthermore, the read control unit and the FIFO read control unit control the reading of the luminance signal from the video memory into the FIFO memory in accordance with the control of the control means.

According to the ninth mode of the present invention thus constructed, furthermore, the read enable signal output circuit outputs the read enable signal on the basis of the third vertical synchronizing signal, the horizontal read reset signal, the vertical read line clock signal and the superimpose starting signal to read out the luminance signal from the area of the video memory, which is specified by either the horizontal reference read dot clock signal or the horizontal read dot clock signal and the read line increment signal. Then, the video switch is switched on the basis of the superimpose starting signal to selectively output the luminance signal, which is read out from the video memory and analogly converted by the digital-analog converter, and the third luminance signal.

According to the tenth mode of the present invention thus constructed, furthermore, the aforementioned horizontal reference read dot clock generator, the horizontal read dot clock generator and vertical read line clock generator are constructed of PLL circuits.

According to the eleventh mode of the present invention thus constructed, furthermore, the control means the individual clock numbers to be counted by the first horizontal read starting counter, the horizontal read number counter, the vertical blanking number counter, the vertical read starting counter and the vertical read number counter.

According to the twelfth mode of the present invention thus constructed, furthermore, the luminance signal, which is analogly converted by the digital-analog converter, and the third luminance signal are selectively outputted like the ninth mode of the present invention.

According to the fifteenth mode of the present invention thus constructed, furthermore, the first luminance signal digitized by the horizontal write dot clock signal is written line the fourth mode of the present invention in the area of the video memory, which is specified by the address signal, the write shift signal and the write line increment signal.

According to the eighteenth mode of the present invention thus constructed, furthermore, the luminance signal, which is read out from the video memory and analogly converted by the digital-analog converter, and the third luminance signal are selectively outputted like the ninth mode of the present invention.

According to the twenty first mode of the present invention thus constructed, furthermore, the luminance signal, which is analogly converted by the digital-analog converter, and the third luminance signal are selectively outputted like the twelfth mode of the present invention.

As has been described hereinbefore, according to the present invention, the decode means separates the first video signal into the first luminance signal, the first horizontal synchronizing signal and the first vertical synchronizing signal and subjects them to the analog-digital conversions. Moreover, the digital-analog conversion means analogly converts the luminance signal, which is stored in the memory means, and the mixing means reads out it from the memory means to output either the converted to analog luminance signal or the second luminance signal selectively as the third luminance signal. Thus, there can be attained an effect to provide an image processing system capable of displaying an image corresponding to the first luminance signal in a desired position, with a desired size and at a desired timing with respect to the image corresponding to the second luminance signal.

Since, moreover, the individual component means are constructed over the one extended slot card, it is possible to provide a compact image processing system.

Thus, on the basis of the first vertical synchronizing signal, the horizontal write clear signal, the horizontal write dot clock signal, the horizontal write starting signal, the horizontal write number signal, the vertical write starting signal, the vertical write number signal and the vertical write line clock signal, the write enable signal is outputted so that the first luminance signal can be written in a desired position and with a desired size, while the horizontal write starting signal and the vertical write starting signal are being outputted, in the area of the video memory, which is specified by the address signal, the write shift signal and the write line increment signal.

Furthermore, the first vertical synchronizing signal is not outputted to the video memory, the vertical write offset counter, the vertical write line clock generator, the vertical write starting counter and the vertical write number counter so that a still image can be easily obtained.

Furthermore, not only the first luminance signal but also the second luminance signal outputted from the control means can be written.

Furthermore, the control means can easily read the first luminance means in accordance with the control of the control means without obstructing the output of that first luminance signal to the monitor.

Furthermore, the video switch is switched on the basis of the superimpose starting signal to selectively output the first luminance signal, which is read out from the video memory and converted to analog by the digital-analog converter, and the third luminance signal.

Furthermore, it is possible to accomplish the so-called "double superimpose", in which the first luminance signal is superimposed upon the third luminance signal whereas the third luminance signal is further superimposed upon the first luminance signal. Thus, the switching is made on the basis of the signal so that the first luminance signal, which is read out from the video memory and converted to analog by the digital-analog converter, and the third luminance signal can be selectively outputted.

[BRIEF DESCRIPTION OF THE DRAWINGS]

FIG. 6 is a diagram for explaining the operations of the image processing system shown in FIG. 1;

FIG. 7 is a memory map;

FIG. 10 is a circuit diagram showing a DMA circuit shown in FIG. 4;

[THE BEST MODE FOR CARRYING OUT THE INVENTION]

The present invention will be described in detail in the following in connection with one embodiment thereof with reference to the accompanying drawings.

Figure 1:
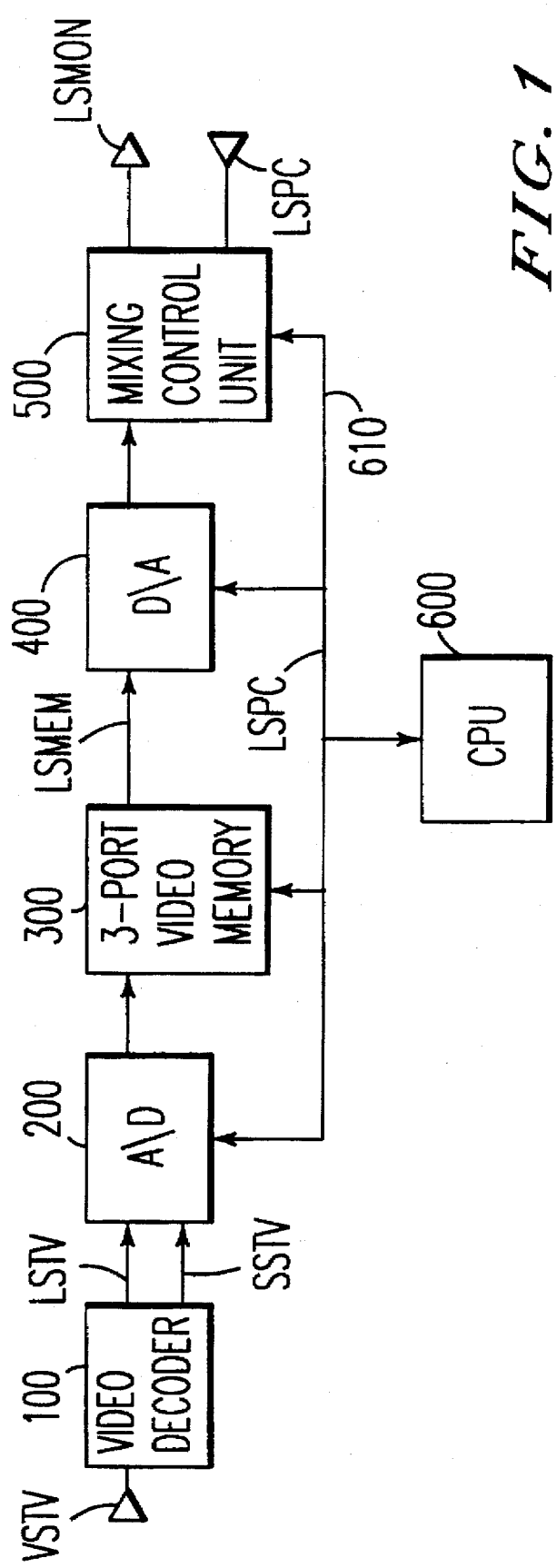
FIG. 1 is a schematic block diagram showing an image processing system according to one embodiment of the present invention.

FIG. 1 is a schematic block diagram showing showing an image processing system according to the embodiment of the present invention. In FIG. 1: reference numeral 100 designates a video decoder for separating either a video signal VSTV coming from a (not-shown) tuner or a video signal VSEX (which will be referred simply as the "video signal VSTV") coming from a (not-shown) external device such as a VTR into a luminance signal LSTV and a synchronizing signal SSTV; numeral 200 designates an ADC control unit for digitizing the luminance signal LSTV numeral 300 designates three-port video memory control unit for storing the digitized luminance signal LSTV; numeral 400 designates a DAC control unit for reading out a luminance signal LSMEM from the three-port video memory control unit 300 to convert it to analog; numeral 500 designates a video mixing control unit for mixing the luminance signal LSMEM read out from the three-port video memory control unit 300 and analogly converted and a luminance signal LSPC outputted from a personal computer, a work station, a terminal, a game machine or the like (which will be shortly referred altogether to the "personal computer", although not shown) to output a luminance signal LSMON in which an image corresponding to the luminance signal LSTV is superimposed in an image corresponding to the luminance signal LSPC; and numeral 600 designates a CPU control unit for outputting control data through a data bus 610 to the video decoder 100, the ADC control unit 200, the three-port video memory control unit 300, the DAC control unit 400 and the video mixing control unit 500.

These control data outputted from the CPU control unit 600 are those for achieving the luminance signal LSMON according to an object and are controlled by the CPU control unit 600.

Figure 2:
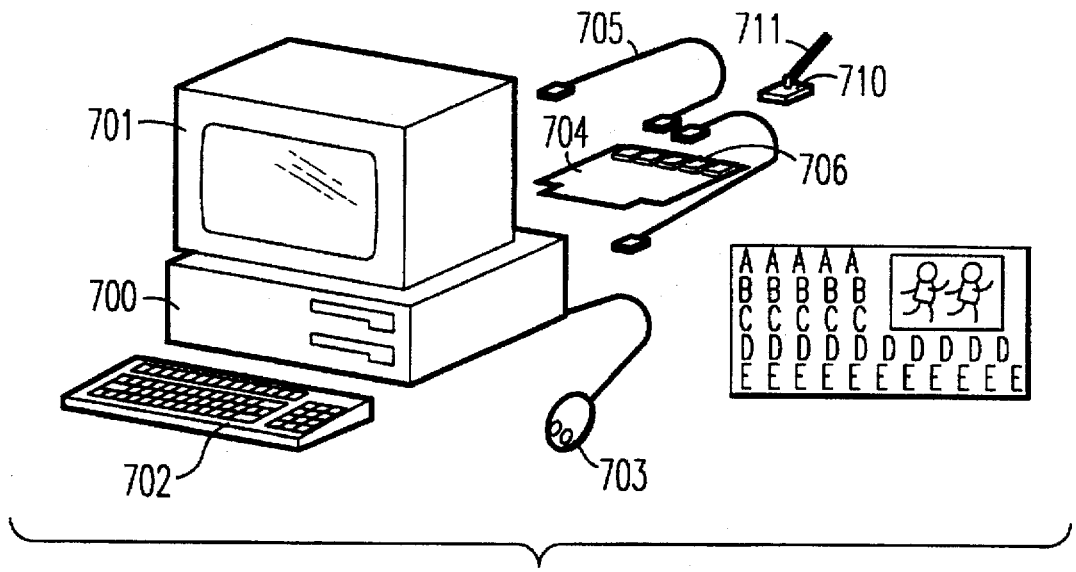
FIG. 2 is an external view showing the image processing system shown in FIG. 1.

Next, FIG. 2 is a perspective view showing the image processing system shown in FIG. 1. In FIG. 2: reference numeral 700 designates a personal computer body; numeral 701 designates a personal computer monitor; numeral 702 designates a keyboard; numeral 703 designates a mouse; numeral 704 designates an extended slot card forming the major portion of the image processing system; numeral 705 designates an inter-body video cable for connecting the personal computer body 700 and the extended slot card 704; numeral 706 designates an inter-monitor video cable for connecting the personal computer monitor 701 and the extended slot car 704; numeral 710 designates a tuner; and numeral 711 designates an antenna.

This image processing system has a structure, in which the extended slot card 704 is interposed between the personal computer body 700 and the personal computer monitor 701.

Figure 3:
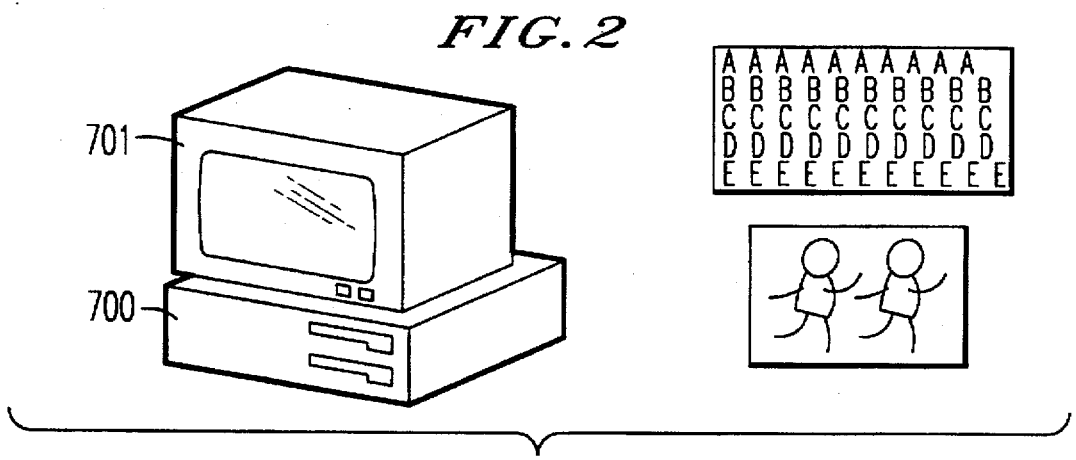
FIG. 3 is an external view showing a personal computer body in which an extended slot card shown in FIG. 2 is built.

The extended slot card 704 is connected with the tuner 710 and inserted into the (not-shown) extended slot of the personal computer body 700, as shown in FIG. 3.

The image corresponding to the luminance signal LSTV outputted from the tuner 710 is displayed together with the image corresponding to the luminance signal LSPC, with an arbitrary size, at an arbitrary timing in an arbitrary position of the image corresponding to the luminance signal LSPC and displayed by the personal computer monitor 701, by the operation of the keyboard 702 or the mouse 703.

Figure 4:
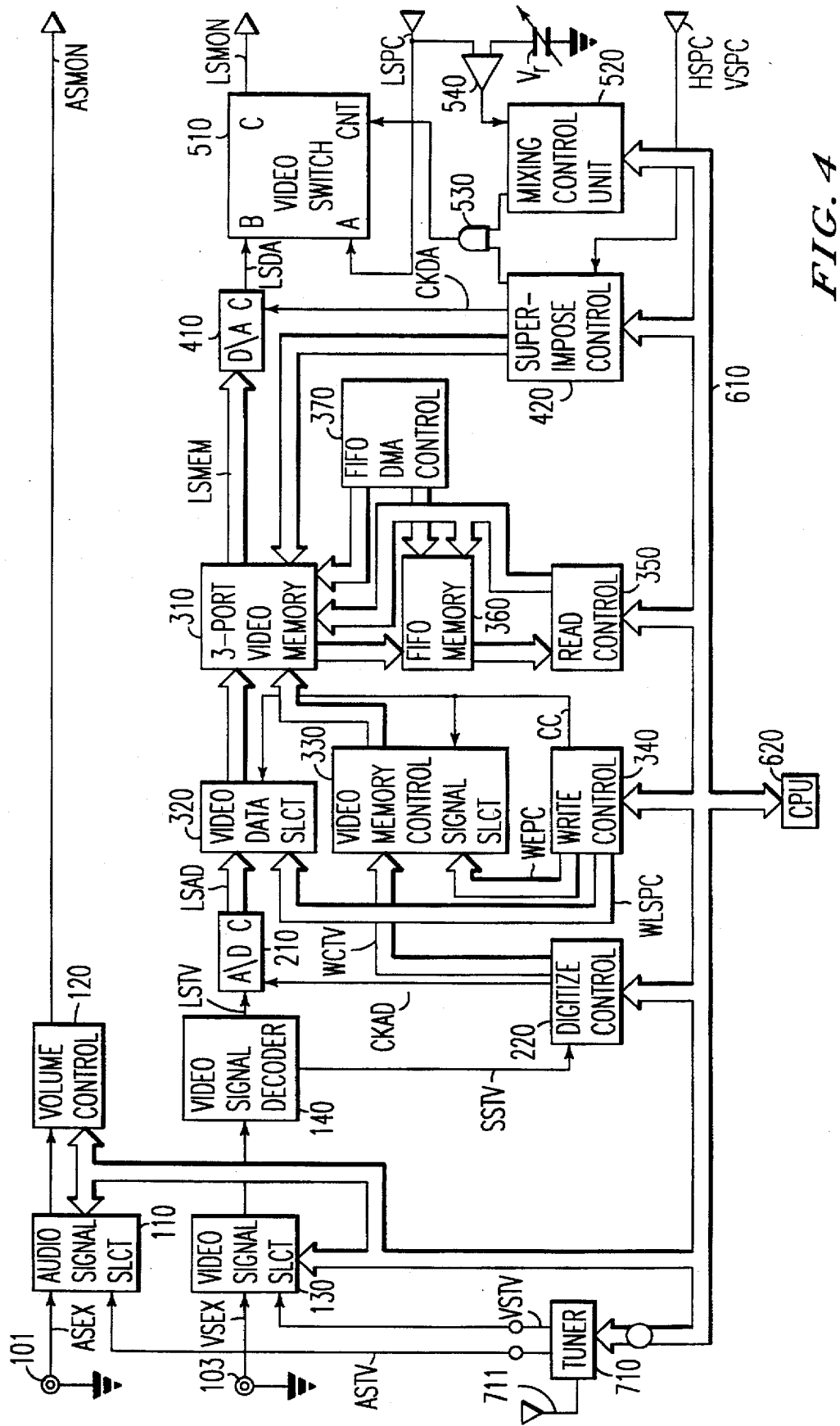
FIG. 4 is a detailed block circuit diagram showing a major portion of the image processing system shown in FIG. 1.

Next, FIG. 4 is a detailed block circuit diagram showing the major portion of the image processing circuit shown in FIG. 1. In FIG. 4: reference numeral 101 designates an audio signal terminal for inputting an audio signal ASEX outputted from the VTR or the like; numeral 110 designates an audio signal selector for selectively outputting the audio signal ASEX inputted from the audio signal terminal 101 and an audio signal ASTV inputted from the tuner 710; numeral 120 designates a volume control circuit for controlling the volume of the audio signal ASTV; numeral 102 designates an audio signal terminal for outputting the selected audio signal ASTV as an audio signal ASMON of the personal computer monitor 701; numeral 103 designates a video signal terminal for inputting a video signal VSEX outputted from the VTR or the like; numeral 130 designates a video signal selector for selectively outputting the video signal VSEX inputted from the video signal terminal 103 and a video signal VSTV inputted from the tuner 710; and numeral 140 designates a video signal decoder for separating the selectively outputted video signal VSTV into the luminance signal LSTV and a synchronizing signal SSTV.

Moreover, numeral 210 designates an ADC for digitizing the luminance signal LSTV; and numeral 220 designates a digitize control unit for controlling the ADC 210 and so on on the basis of the synchronizing signal SSTV.

Moreover, numeral 310 designates a three-port video memory having one write port and two read ports; numeral 320 designates a video data selector for selectively outputting either the luminance signal LSTV outputted from the ADC 210 or the luminance signal LSPC outputted from the (not-shown) personal computer; numeral 330 designates a video memory control signal selector for selectively outputting either a video memory control signal WETV outputted from the digitization control unit 220 or a video memory control signal WEPC outputted from a write control unit 340; this write control unit 340 is used for controlling the luminance signal LSPC outputted from the personal computer in the three-port video memory 310; numeral 350 designates a read control unit; numeral 360 designates a first-in/first-out type FIFO memory for storing the luminance signal LSMEM stored by the three-port video memory 310; and numeral 370 designates a FIFO read control unit for controlling the read of the luminance signal LSMEM coming from the three-port video memory 310.

On the other hand, numeral 410 designates a DAC; numeral 420 designates a superimpose control unit for controlling the three-port video memory 310, the DAC 410 and an AND circuit 530 by inputting a synchronizing signal HSPC and a vertical synchronizing signal VSPC outputted from the personal computer; numeral 510 designates a video switch for outputting either of the luminance signal LSPC coming from the personal computer or the luminance signal LSMEM coming from the three-port video memory 310 as the luminance signal LSMON of the personal computer monitor; numeral 520 designates a mixing control unit; numeral 540 designates a voltage comparator for comparing a reference voltage $V_r$ and the luminance signal LBPC coming from the personal computer; and numeral 620 designates a CPU in the personal computer body.

Figure 5:
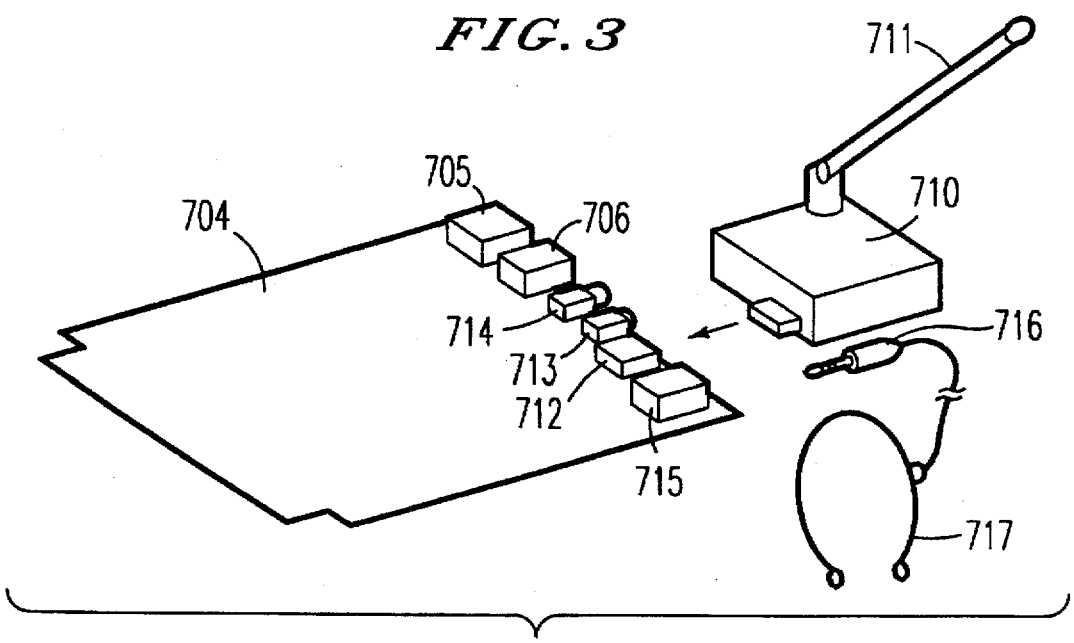
FIG. 5 is a connection diagram between the extended slot card shown in FIG. 2 and a tuner.

Next, FIG. 5 is a connection diagram for connecting the tuner 710 and the extended slot card 704. In FIG. 5: numeral 712 designates a tuner control connector for outputting the control signal such as the power source or tuning signal of the tuner 710 to the tuner 710; numeral 713 designates an output connector for outputting the audio signal ASTV outputted from the tuner 710 to the extended slot card 704; and numeral 714 designates an output connector for outputting the video signal VSTV outputted from the tuner 710 to the extended slot card 704.

Here, the audio signal ASTV can be outputted to a headphone 717 or a (not-shown) speaker through a plug 716 connected with an output connector 715.

The tuner 710 outputs the audio signal ASTV and video signal VSTV of specified channels of the signals it receives from the antenna 711 and the antenna terminal, to the audio signal selector 110 and the video signal selector 130, respectively, through the output connectors 713 and 714.

In this case, the tuning is accomplished by controlling the CPU 620.

On the other hand, the audio signal ASEX and the video signal VSEX are outputted from a (not-shown) video device such as a video deck or a laser disc, respectively, to the audio signal selector 110 and the video signal selector 130.

The audio input selector 110 is controlled by the CPU 620 to select and output the audio signal ASTV or ASEX to the volume control circuit 120.

This volume control circuit 120 is controlled by the CPU 620 to amplify the audio signal ASTV outputted from the audio signal selector 110 and to output it as the audio signal ASMON in the personal computer monitor cable to the audio signal terminal 102.

The audio signal ASTV is outputted to the output connector 714.

The video signal selector 130 is controlled by the CPU 620 to select and output the video signal VSTV or VSEX to the video signal decoder 140.

FIG. 6 is a diagram for explaining the operations of the present image processing system. The image displayed in the display frame 301 of the personal computer monitor corresponding to the video signal obtained from the tuner 710 is displayed in a reduced scale to move at a righthand upper portion.

The display area is assigned by mouse cursor 301 using mouse 703. The image obtained from tuner 710 is displayed in the assigned display area.

FIG. 7 shows a memory map in which the OS or MS-DOS (as known under the trade name) of the personal computer is packaged as the used in-OS device driver (or the front processor) by using the utility software of the present invention.

Thanks to this packaging, the utility software can be run to observe the image from the TV set or the video deck in a preferable position and with a preferable size by a simple keyboard operation no matter what application software is operating on the OS.

The video signal decoder 140 separates the video signal VSTV, which is outputted from the video signal selector 130, into the luminance signal LSTV and the synchronizing signal SSTV and outputs them to the ADC 210 and the digitize control unit 220 respectively, as shown in FIG. 4.

Here the synchronizing signal SSTV is composed of the vertical synchronizing signal VSTV and a horizontal synchronizing signal HSTV.

In response to a clock signal CKAD outputted from the digitize control unit 220, the ADC 210 converts the luminance signal LSTV outputted from the video signal decoder 140 into a digital signal and outputs it through the video data selection unit 320 to the three-port video memory 310.

The digitization control unit 220 outputs not only the clock signal CKAD to the ADC 210 but also the video memory control signal WETV through the video memory control signal selection unit 330 to the three-port video memory 310.

Thus, the three-port video memory 310 stores the updated luminance signal LSTV under the condition controlled by the CPU 620.

Figure 8:
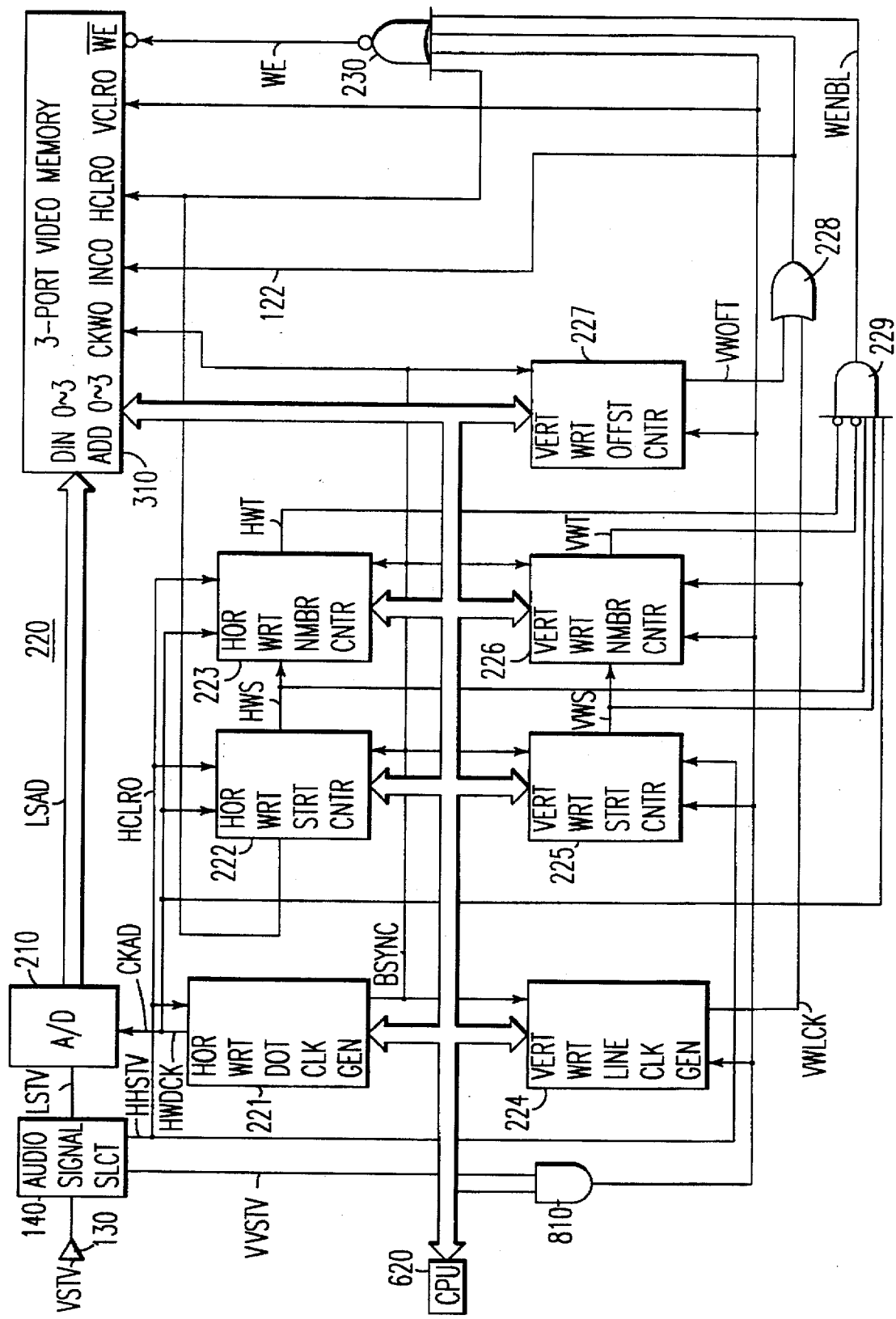
FIG. 8 is a circuit diagram showing a digitize control unit shown in FIG. 4 and its peripheral circuits.

FIG. 8 is a block diagram diagram showing the digitize control unit 220 shown in FIG. 4 and its peripheral circuits.

Here is omitted the video memory control signal selector 330. In the present embodiment, the three-port video memory 310 is exemplified by the product CSK1206 of SONY and the product NB81C1501 of FUJITSU.

Incidentally, the following description will be made by using only the read ports of the three-port video memory 310, The characteristic timing chart is disclosed on pp. 21 to 26 of the Data Sheet 71215-ST of SONY.

The three-port video memory 910 is constructed to have a capacity of 960 columns×306 rows×4 bits, As a result, one effective horizontal scanning period can be quantized with the numerical value of 960.

On the other hand, the three-port video memory 310 is accessed for the columns at the unit of block and for the rows at the unit of line.

In the three-port video memory 310: reference characters DIN0 to DIN3 designate data inputs for inputting the luminance signal LSTV; characters ADD0 to ADD3 designate address inputs; characters CKWO designate a port-O shift signal; characters INCO designate a port-O line increment signal; characters HCLRO designate a port-O horizontal clear signal; characters VCLRO designate a port-O vertical clear signal; and characters WE (i.e., negative logic) designate a port-O write enable signal.

These signals CKWO, VCLRO, HCLRO, INCO and WE (i.e., negative logic), ADD0 and DIN0 to DIN3 are dichroic video signals of 4 bits, i.e., 16 gradations.

Here, even color luminance signals of 4 bits or more could naturally be likewise handled by connecting a plurality of three-port video memories 310 in parallel.

In FIG. 8: reference numeral 140 designates the video signal decoder for separating the video signal VSTV into the horizontal synchronizing signal HSTV, the vertical synchronizing signal VSTV and the luminance signal LSTV to output them; numeral 221 designates a dot clock generator for outputting a horizontal write dot clock signal HDCK and a basic synchronizing signal BSYNC; numeral 222 designates a horizontal write starting counter for outputting a horizontal write starting signal HWS and an HCLRO signal; numeral 223 designates a horizontal write number counter for outputting a horizontal write number signal HWT; numeral 224 a vertical write line clock generator for outputting vertical write line clock signal VWLCK; numeral 225 designates a vertical write starting counter for outputting a vertical write starting signal VWS; numeral 226 designates a vertical write number counter for outputting vertical write number signal VWT; numeral 227 designates a vertical write offset counter for outputting a vertical write offset signal VWOFT for designating the vertical write position of the three-port video memory 310 and the port-O line increment INCO; numeral 228 designates an OR circuit for outputting either the vertical write line clock signal VWLCK or the vertical write offset signal VWOFT as the port-O line increment INCO; numeral 229 designates an AND circuit for taking the logical product of the inverted outputs of the horizontal write dot clock signal HDCK, the horizontal write starting signal HWS and the horizontal write number signal HWT and the inverted outputs of the vertical write starting signal VWS and the vertical write number signal VWT to output a write enable signal WENBL; and numeral 230 designates a NOR Circuit for taking the output of AND 810, the HCLRO signal, the output signal of the OR circuit 228 and the write enable signal WENBL outputted from the AND circuit 229 to output the port-O write enable signal WE.

Incidentally for the color display, the luminance signal LSTV is composed of individual R, G and B luminance signals RLSTV, GLSTV and BLSTV.

The video signal decoder 140 separates the video signal VSTV outputted from the video signal selector 130, into the horizontal synchronizing signal HSTV, the vertical synchronizing signal VSTV and the luminance signal LSTV.

The horizontal synchronizing signal HSTV is outputted to the dot clock generator 221, the horizontal write starting counter 222, the horizontal write number counter 223 and the vertical write starting counter 225.

The vertical synchronizing signal VSTV is outputted to the vertical write line clock generator 224, the vertical write starting counter 225, the vertical write number counter 226, the vertical write offset counter 227, the port-O vertical clear terminal VCLRO of the three-port video memory 310, and the NOR circuit 230.

Moreover, the luminance signal LSTV is outputted to the ADC 210.

This ADC 210 digitizes the luminance signal LSTV1 in response to the horizontal write dot clock signal HDCK, which is inputted as the clock signal CKAD, to output the digitized the luminance signal LSTV to the three-port video memory 310.

The dot clock generator 221 generates the horizontal write dot clock signal HDCK having a period of 1/N (N: a positive integer) in synchronism with the horizontal synchronizing signal HSTV, i.e., the period 63.5 μs of the horizontal synchronizing signal HSTV. The horizontal write dot clock signal HDCK is outputted to the ADC 210, the horizontal write starting counter 222, the horizontal write number counter 223 and the AND circuit 229.

In case the block unit of the address preset of the three-port video memory 310 is 60 dots whereas one effective horizontal scanning period of the vertical synchronizing signal VSTV is 50 (μs), the horizontal write dot clock signal HDCK has its frequency calculated, as follows:

$$60 \text{ (dots)}/50\cdot 10^{-6} \text{ } (S) = 1.2 \text{ (MHz)}.$$

By this horizontal write dot clock signal HDCK, one effective horizontal scanning period can be quantized with 60 dots.

Since the three-port video memory 310 is constructed to have sixteen blocks (=960 dots for 60 dots composing one block), the luminance signal LSTV of one effective horizontal scanning period can be written at the unit of block, as follows:

$$1.2 \text{ (MHz)} \times 16 \text{ (blocks)} = 19.2 \text{ (MHz)}.$$

Thus, the dot clock generator 221 outputs the horizontal write dot clock signal HDCK having the frequency based upon the value of the block B.

Here, the value of the block B can be set by the CPU 620.

Moreover, the dot clock generator 221 generates a basic synchronizing signal BSYNC to be used as the clock of the port-O shift signal terminal CKWO (for incrementing the horizontal write address of the three-port video memory 310 at the unit of dot) of the three-port video memory 310.

As a result, the image corresponding to the luminance signal LSTV is enlarged when the period of the clock signal CKAD for digitizing the luminance signal LSTV is longer than that of the basic synchronizing signal BSYNC for incrementing the horizontal write address of the three-port video memory 310 at the unit of dot. When, on the contrary, the period of the clock signal CKAD is smaller than that of the basic synchronizing signal BSYNC, the image corresponding to the luminance signal LSTV is reduced.

The basic synchronizing signal BSYNC is one for synchronizing the individual control circuits basically and is outputted to the horizontal write starting counter 222, the horizontal write number counter 223, the vertical write line clock generator 224, the vertical write starting counter 225, the vertical write number counter 226, the vertical offset counter 227 and the three-port video memory 310.

The vertical write line clock generator 224 is synchronized with the vertical synchronizing signal VSTV to output the vertical write line clock signal VWLCK having a frequency an N times as high as that of the vertical synchronizing signal VSTV to the vertical write number counter 226 and the OR circuit 230.

Incidentally, the value of N can be set by the CFU 620. The value of N is determined on the basis of an aspect ratio suitable for the dot clock generator 221.

The horizontal write starting counter 222 is reset by the horizontal synchronizing signal HSTV to count the clock number of the horizontal write dot clock signal HWDCK thereby to output the horizontal write starting signal HWS starting the quantization of the luminance signal LSTV at the $S_1$-th clock for the effective horizontal scanning period of the video signal VSTV.

The horizontal write starting counter 222 outputs one clock of the port-O horizontal clear signal HCLRO together with the horizontal write starting signal HWS to AND circuit 229.

The horizontal write time counter 223 starts the counting of the clocks of the horizontal write dot clock signal HWDCK, when it is reset by the horizontal synchronizing signal HSTV to output the horizontal write starting signal HWS, to output the horizontal write number signal HWT allowing the quantization of the luminance signal LSTV only for the period of the $E_1$ clocks of the effective horizontal scanning period of the luminance signal VSTV.

Thus, the horizontal write number counter 223 controls the effective horizontal scanning period.

The vertical write starting counter 225 is reset by the vertical synchronizing signal VSTV to count the clock number of the horizontal synchronizing signal HSTV thereby to output the vertical write starting signal VWS allowing the quantization of the luminance signal LSTV of the effective horizontal scanning from the $S_2$-th clock of the vertical effective scanning period of the video signal VSTV.

The vertical write number counter 226 starts the counting of the clocks of the vertical write line clock signal VWLCK, when the vertical write starting signal VWS is outputted, to output the vertical write number signal VWT allowing the quantization of the luminance signal LSTV for the period of the clocks $E_2$ of the vertical effective scanning period of the video signal VSTV.

Thus, the vertical write number counter 226 controls the vertical effective scanning period.

The write position in the horizontal direction, i.e., in the COLUMN direction of the three-port video memory 310 with respect to the display frame is determined by a block designation, in which the sixty bits of the quantized luminance signal LSTV is one block, in accordance with an address preset mode.

This block designation is accomplished at sixteen steps in response to address input signals ADD0 to ADD3.

These address input signals ADD0 to ADD3 can be set by the CPU 620.

The vertical write position of the three-port video memory 310 is set by the vertical write offset counter 227.

The vertical write offset counter 227 is reset by the vertical synchronizing signal VSTV and the counter outputs the vertical write offset signal VWOFT for offsetting the vertical write position of the three-port video memory 310 in synchronism with the basic synchronizing signal BSYNC thereby to control the vertical write position of the three-port video memory 310.

Here, these values of $S_1$, $E_1$, $S_2$, $E_2$ and $S_3$ are set by the CFU 620.

Next, the operations of the digitize control unit 220 and its peripheral circuits shown in FIG. 8 will be described in the following with reference to the timing chart of FIG. 9.

Figure 9:
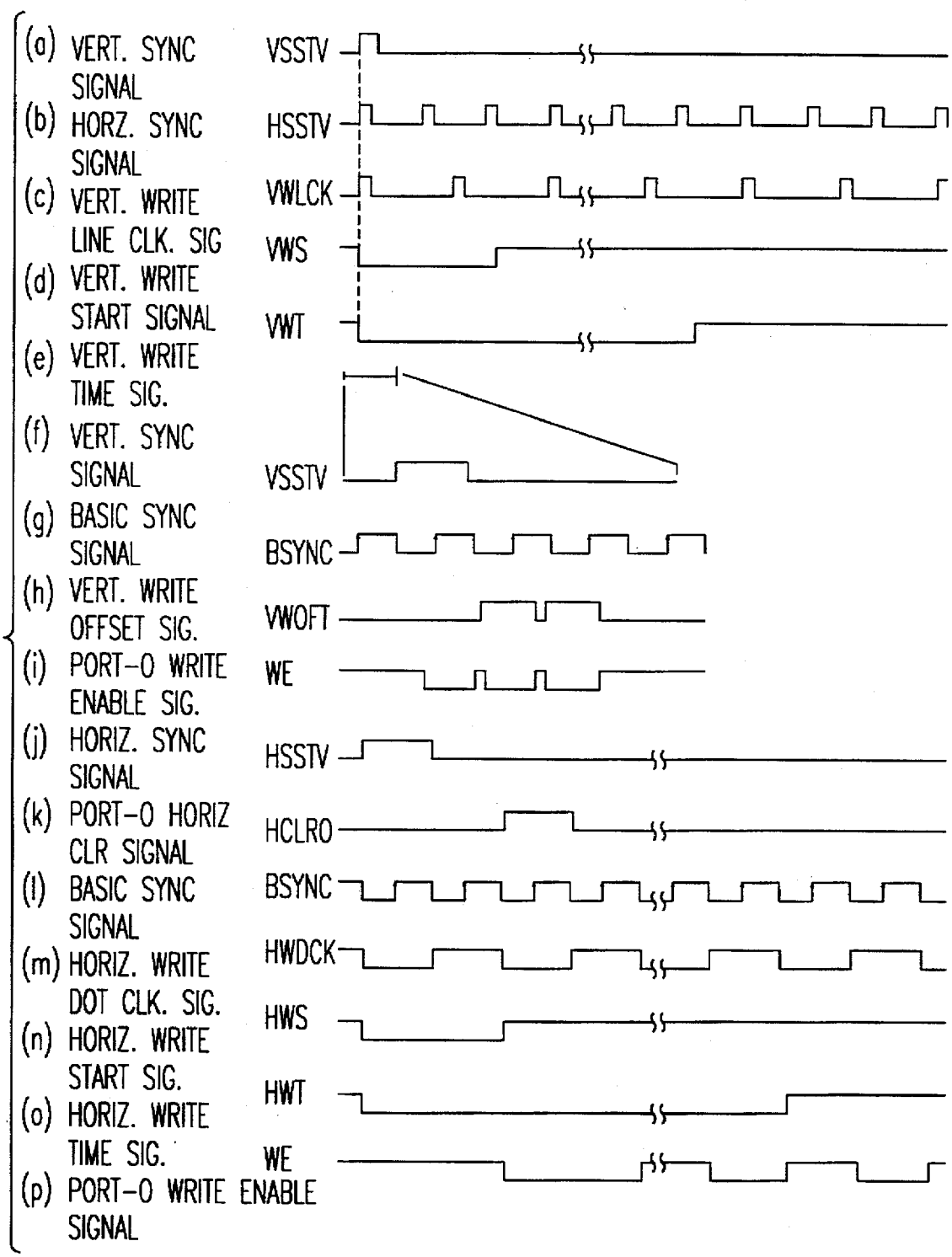
FIG. 9 is a timing chart showing the operations of the digitize control unit shown in FIG. 4 and its peripheral circuits.

(1) When the vertical synchronizing signal VSTV takes a high level "H" (as shown at (a) in FIG. 9), the vertical write starting counter 225, the vertical write number counter 226 and the vertical write offset counter 227 are reset to set the vertical write starting signal VWS and the vertical write number signal VWT at a low level "L" (as shown at (d) and (e) in FIG. 9).

(2) The vertical write offset counter 227 outputs basic synchronizing signal BSYNC as the vertical write offset signal VWOFT for the period of the $S_3$ clocks (as shown at (h) in FIG. g).

The vertical write offset signal VWOFT is outputted through the OR circuit 228 to the port-O line increment signal terminal INCO so that the three-port video memory 310 has its vertical address incremented by the $S_3$ times.

(3) When the clock number of the vertical synchronizing signal VSTV takes the value $S_2$, on the other hand, the vertical write starting counter 225 raises the vertical write starting signal VWS to the high level "H" to allow the quantization of the vertical effective scanning period (as shown at (d) in FIG. 9).

(4) The three-port video memory 310 has its vertical write offset, when it receives the clocks of the vertical write offset signal VWOFT so that the horizontal synchronizing signal HSTV takes the high level "H". Then, the horizontal write starting counter 222 and the horizontal write number counter 223 are reset to drop the horizontal write starting signal HWS and the horizontal write number signal HWT to the low level "L" (as shown at (n) and (o) in FIG. 9).

On the other hand, the dot clock generator 221 outputs the horizontal write dot clock signal HWDCK (as shown at (m) in FIG. 9).

In response to the output of the horizontal write dot clock signal HWDCK, the ADC 210 uses the horizontal write dot clock signal HWDCK as the sampling hold signal and the data latch signal to sample the luminance signal LSTV.

The horizontal write starting counter 222 counts the number of cycles of the horizontal write dot clock signal HWDCK to raise the horizontal write starting signal HWS to the high level "H", when the counted value reaches $S_1$, thereby to allow the quantization of the effective horizontal scanning period (as shown at (n) in FIG. 9).

Simultaneously with this, the horizontal write start counter 222 outputs one clock of the port-0 horizontal clear signal HCLR0 of the three-port video memory 310 to prepare the writing operations.

At this time, the AND circuit 229 takes the logical product condition among the horizontal write starting signal HWS at the high level "H", the inverted horizontal write number signal HWT at the low level "L", the vertical write starting signal VWS at the high level "H" and the inverted vertical write number signal VWT at the low level "L" to output the horizontal write dot clock signal HWDCK as the write enable signal WENBL to the NOR circuit 230.

Then, this NOR circuit 230 takes the NOT-OR condition among the port-0 horizontal clear signal HCLR0 at the high level "H", the vertical synchronizing signal VSTV at the high level "H", the vertical write offset signal VWOFT or the vertical write line clock signal VWLCK at the high level "H" and the write enable signal WENBL to output the write enable signal WE to the write enable signal terminal WE of the three-port video memory 310.

In response to the output of the write enable signal WE, the three-port video memory 310 writes the luminance signal LSTV outputted from the ADC 210.

Simultaneously with this, the horizontal write number counter 223 counts the clock number of the horizontal write dot clock signal HWDCK to allow the write of the luminance signal LSTV till the counted value reaches $E_1$.

When this counted value reaches $E_1$, the horizontal write number counter 223 raises the horizontal write number signal HWT to the high level "H" to inhibit the write (as shown at (o) in FIG. 9).

While the luminance signal LSTV is being written, the line addresses in the common vertical direction are written in the horizontal direction till the vertical write line clock generator 224 outputs the vertical write line clock signal VWLCK.

When the vertical write line clock generator 224 outputs the vertical write line clock signal VWLCK as the port-0 line increment signal terminal INC0 of the three-port video memory 310, the write line address of the three-port video memory 310 in the vertical direction advances by 1.

When the clock number of the vertical write line clock signal VWLCK outputted to the vertical write number counter 226 from the vertical write line clock generator 224 reaches the value $E_2$, the vertical write number counter 226 raises the vertical write number signal VWT to the high level "H" to interrupt the writing of the three-port video memory 310 for the vertical effective scanning period (as shown at (e) in FIG. 9).

This interruption of writing is continued till the vertical synchronizing signal VSTV takes another round of the high level "H".

In the present embodiment thus far described, the smart image can be realized, although difficult in the prior art, by controlling the control signals to be outputted to the ADC 210 and the three-port video memory 310, with respect to the single signal flow.

Incidentally, the active logic is effected by the high level "H" in the aforementioned operations but may be likewise accomplished by the low level "L".

According to the present embodiment, the imaging techniques such as the arbitrary resolution of the video signal VSTV, the arbitrary aspect ratio, the window display of the arbitrary region or the multi-strobo still image can be easily controlled by the CPU 620, and the production cost can be easily dropped for home appliances. Therefore, the image processing system can be used in not only a video device such as a personal computer TV set, an intelligence terminal, a TV telephone or a smart TV set but also an area designated monitor system using a video monitor camera and is indispensable in a future machine associated with images.

The three-port video memory 310 accomplishes the following operations in case the CPU 620 writes video data.

First of all, the CPU 620 controls a change-over control signal CC of the write control unit 340 to switch the video data selection unit 320 and the video memory control signal selection unit 330.

As a result of this switching, the three-port video memory 310 receives not a write control signal WCTV outputted from the digitize control unit 220 but a write control signal WCFC outputted from the write control unit 340.

The luminance signal LSPC outputted from the CPU 620 is inputted through the write control unit 340 and the video data selection unit 320 to the three-port video memory 310.

The three-port video memory 310 is written with that luminance signal LSFC in response to the write control signal WCPC outputted from the write control unit 340.

Next, the three-port video memory 310 transfers the luminance signal to the FIFO memory 360 by the DMA transfer.

FIG. 10 is a block circuit diagram showing the three-port video memory 310, the FIFO memory 360, the FIFO DMA control unit 370 all relating to that DMA transfer, and their peripheral circuits.

Here, the FIFO memory 360 has a storage capacity equal to or more than that of the three-port video memory 310.

Here will be described the operations in which the CPU 620 reads out the stored luminance signal LSMEM of the three-port video memory 310 by the DMA.

First of all, the read control unit 350 controlled by the CPU 620 outputs the scanning line information or the offset value of the scanning line, which is to be read out from the three-port video memory 310, to the three-port video memory 310.

The FIFO DMA control unit 370 subjects the three-port video memory 310 to the direct memory access (which will be shortly referred to the "DMA") with the luminance data LSMEM of the canning line to transfer the luminance signal LSMEM to the input port of the asynchronous I/O or the FIFO memory 360.

The CPU 620 reads in the luminance signal LSMEM thus transferred to the FIFO memory 360, from the output port of the FIFO memory 360 through the read control unit 350 and the CPU bus 610.

Incidentally, the present invention can naturally be embodied if the personal computer body and the personal computer monitor are integrated, although the present embodiment has been described in the case of the computer body and the personal computer monitor being separated.

Next, the operations of the DMA circuit shown in FIG. 10 will be described in the following with reference to the timing chart of FIG. 11.

Figure 11:
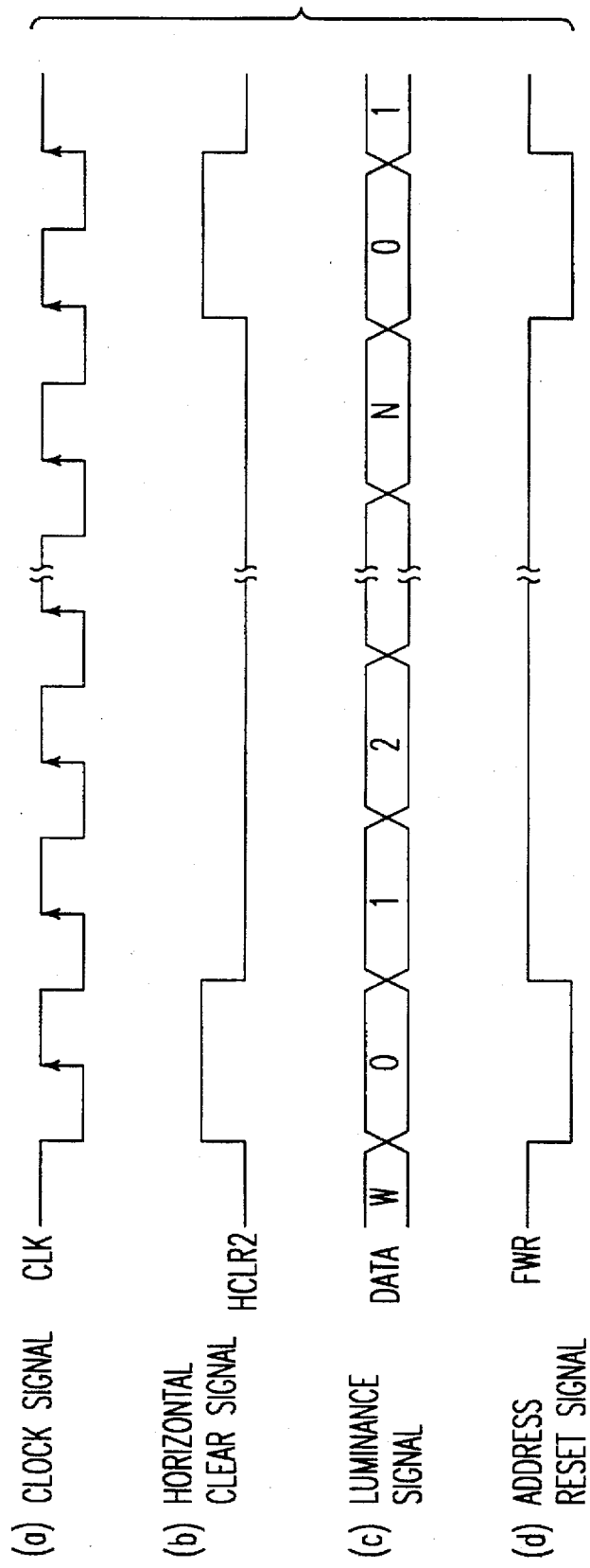
FIG. 11 is a timing chart showing the operations of the DMA circuit shown in FIG. 4.

(1) When the FIFO DMA control unit 370 outputs horizontal clear signal HCLR, which is used to reset the horizontal address of the three-port video memory 310, through a luminance data bus 371 to the three-port video memory 310 (as shown at (b) in FIG. 11), the three-port video memory 310 is set at a 0 address.

When, on the other hand, the FIFO read control unit 370 outputs the address reset signal FRR (i.e., the signal inverted from the horizontal clear signal HCLR by a NOT circuit 372) of the FIFO memory 360 to the FIFO memory 360 simultaneously with the output of the horizontal clear signal HCLR (as shown at (d) in FIG. 11), the write address of the FIFO memory 360 is set at the 0 address.

(2) Each time the clock signal CLK outputted from the FIFO DMA control unit 370 rises after the setting of the three-port video memory 310 (as shown at (a) in FIG. 11), this three-port video memory 310 outputs the luminance signal LSMEM (as shown at (c) in FIG. 11) so that the FIFO memory 360 reads in the luminance signal LSMEM outputted from the three-port video memory 310.

(3) Each time the clock signal CLK rises (as shown at (a) in FIG. 11), the addresses of both the three-port video memory 310 and the FIFO memory 360 are incremented one by one so that the reading of the luminance signal LSMEM from the three-port video memory 310 and the writing of the luminance signal LSMEM in the FIFO memory 360 are repeatedly executed.

(4) When the reading and writing of the luminance signal LSMEM are accomplished by the N times (i.e., the maximum number of repetitions), the FIFO DMA control unit 370 outputs the horizontal clear signals HCLR and FRR to set the addresses of the three-port video memory 310 and the FIFO memory 360 to the 0 address so that the aforementioned operations are repeated.

Since, in this case, the clock signal CLK outputted from the FIFO DMA control unit 370 is given a frequency no less than 10 MHz by the specifications of the reading condition of the three-port video memory 310, it is used as the refresh timing of the three-port video memory 310.

Figure 12:
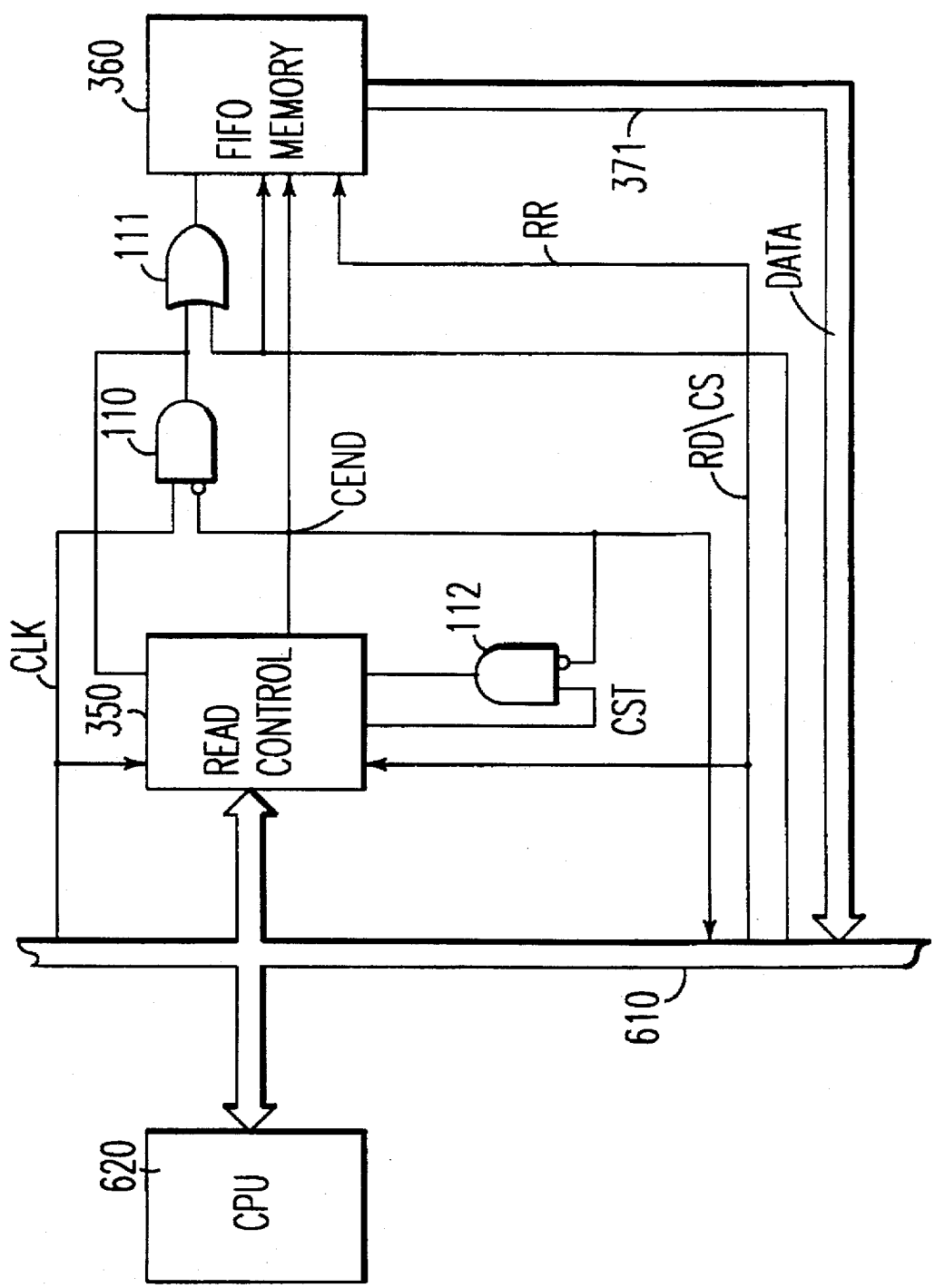
FIG. 12 is a circuit diagram showing an offset circuit.

Next, FIG. 12 is a circuit diagram showing an offset circuit for reading out a luminance signal LSFIFO from the FIFO memory 360 by setting the address of the FIFO memory 380, which is stored with the luminance signal of the three-port video memory 310, at a predetermined address.

The operations of this offset circuit will be described with reference to the timing chart of FIG. 13.

(1) The CPU 620 sets the read offset value N of the FIFO memory 380 in the read control unit 350 through the CFU bus 610.

Figure 13:
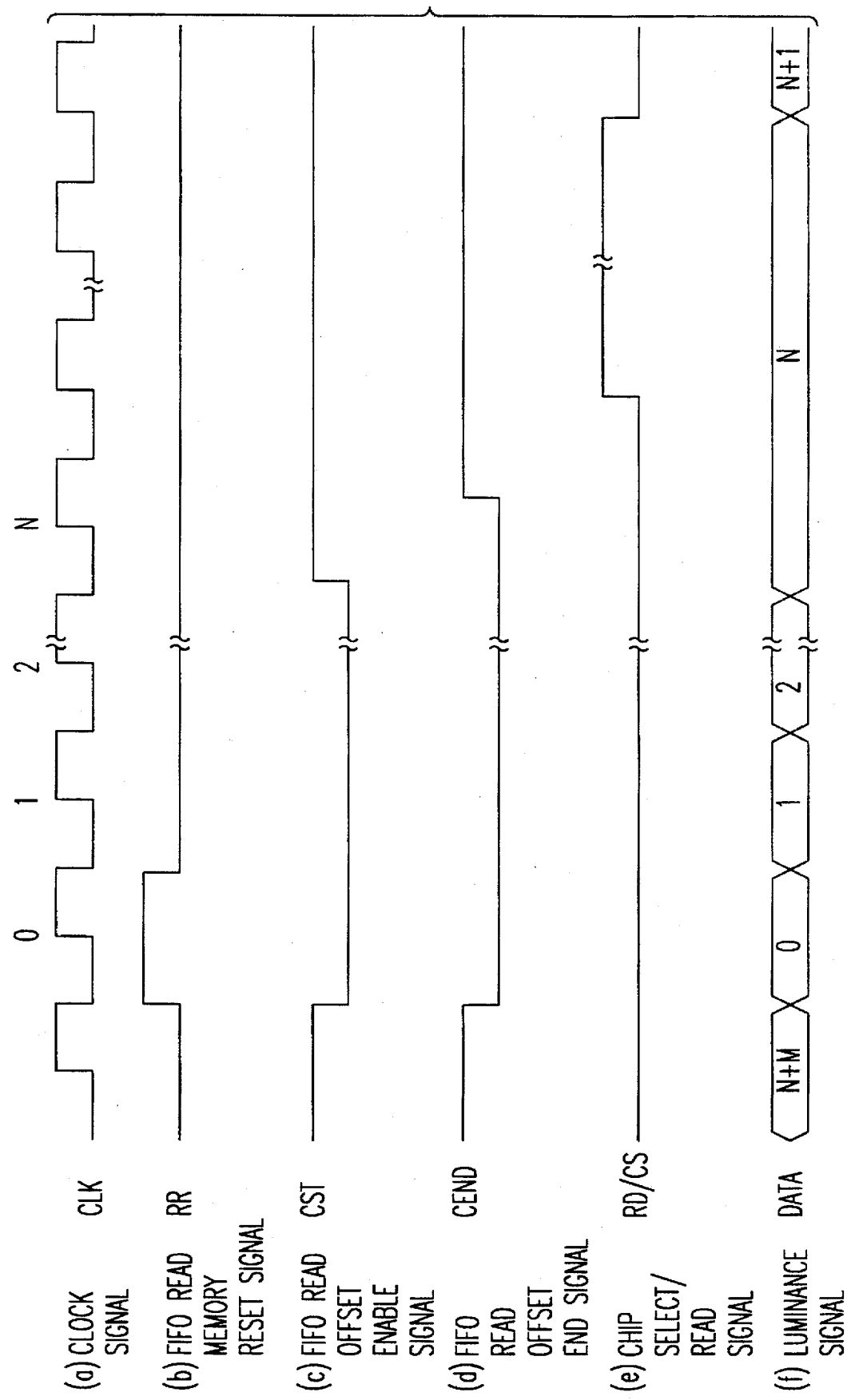
FIG. 13 is a timing chart showing the operations of the offset circuit shown in FIG. 12.

(2) If the CFU 620 outputs an FIFO read memory set signal RR at the high level "H" (as shown at (b) in FIG. 13, the counter in the FIFO read control unit 350 and the read address in the FIFO memory 380 are set to the 0 address.

In response to the output of the FIFO read memory reset signal RR, moreover, an FIFO read offset starting signal CST for starting the clock in the read control unit 350 and an FIFO offset ending signal CEND for ending the clock are dropped to the low level "L" so that the CPU 620 the clock signal CLK of the N clocks to the FIFO memory 360 and the FIFO read control unit 350.

(3). After the clock signal CLK has been outputted by the N clocks (as shown at (a) in FIG. 13), the FIFO read control unit 350 raises the FIFO read offset ending signal CEND to the high level "H" (as shown at (d) in FIG. 13) to stop the output of the clock signal CLK to the FIFO memory 360 and the FIFO read control unit 350.

At this time, the FIFO memory 360 outputs an N-address luminance signal LSFIFO as the DATA signal at its output portion.

The FIFO read offset ending signal CEND is outputted to the CPU 620, too, so that the CFU 620 reads in the DATA signal in response to the high level "H" of a chip select/read signal RD/CS.

(4) When this chip select/read signal RD/CS takes the low level !"L", the FIFO memory 360 has its address incremented by 1.

The Read cycle of CPU 620 is approximately 1 MHz, while the frequency of the clock signal CLK is 10 MHz or more. When the offset position is determined by using the clock signal CLK, only 1/10 of the time of the CPU Read cycle is used, thus achieving substantial performance improvement.

Since the output portion of the three-port video memory 310 can be operated with a frequency of 10 (MHz) or higher, as has been described hereinbefore, the clock signal CLK can be used as the refresh timing of a dynamic memory of the three-port video memory 310.

Thus, the transfer of the luminance signal LSMEM from the three-port video memory 310 to the DAC 410 is not interrupted so that a superimposed image is always outputted as the luminance signal LSMON to the personal computer monitor.

Therefore, the present invention can be applied to the promising video appliances such as the personal computer TV set, the intelligent terminal or the TV telephone.

Incidentally, the logics of the timing chart shown in FIG. 13 are merely explanatory and should not be limited thereto.

Moreover, the transfer of the luminance data has been described in the present embodiment in the state having the personal computer body and monitor separated from each other but could be accomplished in case the body and monitor are integrated into one personal computer.

Next, the superimpose control unit 420 outputs the read control signal and the clock signal CKDA to the three-port video memory 310 and the DAC 410 on the basis of the conditions controlled by the CPU 620.

In response to the read control signal, the up-dated luminance signal LSMEM is read out from the three-port video memory 310.

The DAC 410 converts the luminance signal LSMEM, which is read out from the three-port video memory 310, into the analog signal LSDA and outputs it to the video switch 510.

The AND circuit 530 takes an AND condition between the superimpose starting signal outputted from the superimpose control unit 420 and the multiplex super impose starting signal outputted from the mixing control unit 520 controlled by the CPU 620.

The video switch 510 switched on the basis of the output signal of the AND circuit 530 to superimpose the luminance signal LSMEM outputted from the DAC 410 on the personal computer body side luminance signal LSPC.

Figure 14:
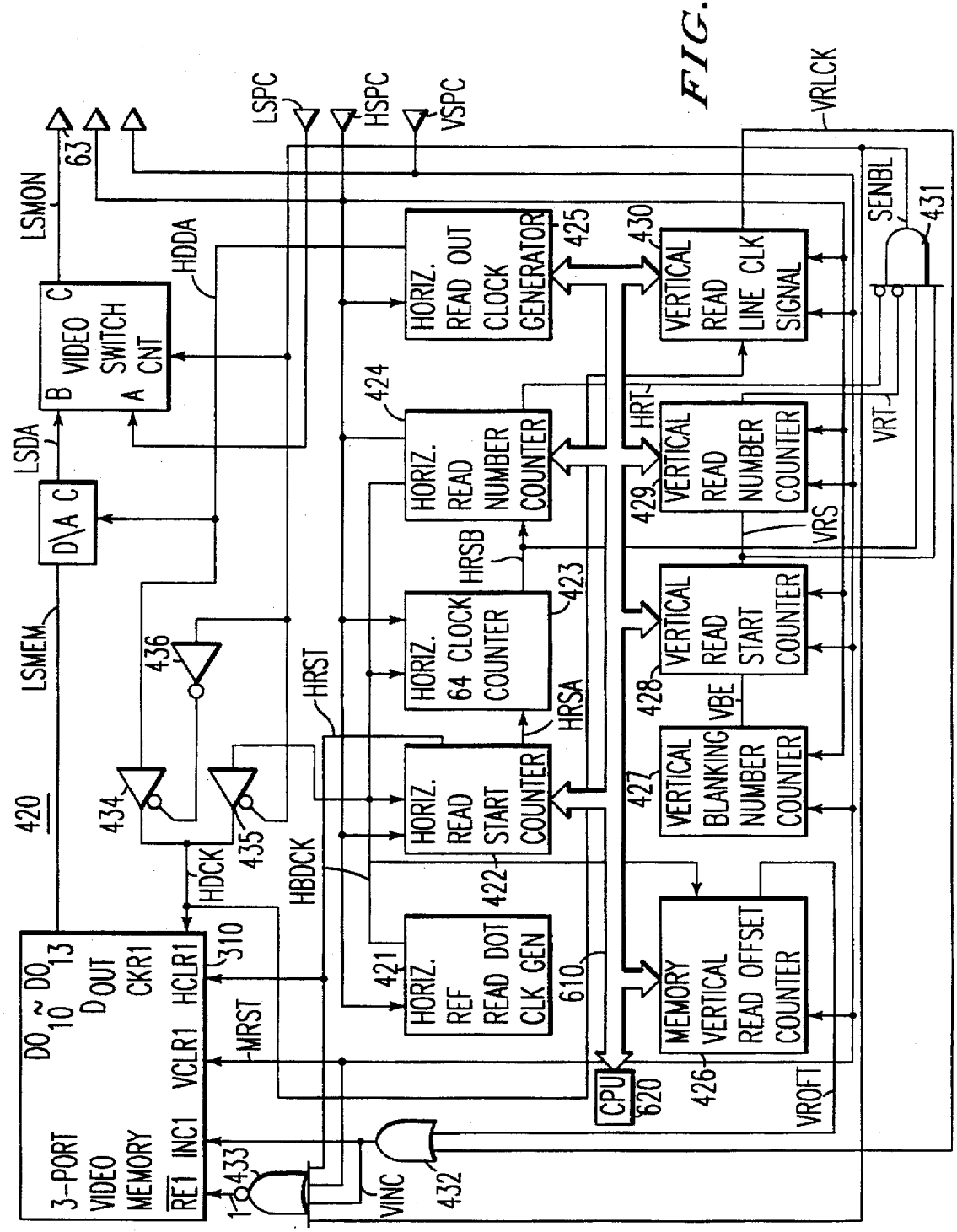
FIG. 14 is a circuit diagram showing a superimpose control circuit shown in FIG. 4 and its peripheral circuits.

Next, FIG. 14 is a block circuit diagram showing the superimpose control unit 420 shown in FIG. 4 and its peripheral circuits. Here is emitted the AND circuit 530.

Moreover, the three-port video memory 310 is exemplified by the aforementioned product CXK1206 of SONY or MB81C1501 of FUJITSU, and the read port of its three input/output ports is used.

The timing chart is disclosed on pp. 27 to 31 of the data sheet No. 71215-ST of the CXK1206 of SONY. The port used is the read port 1 appearing on pp. 2.

Figure 22:
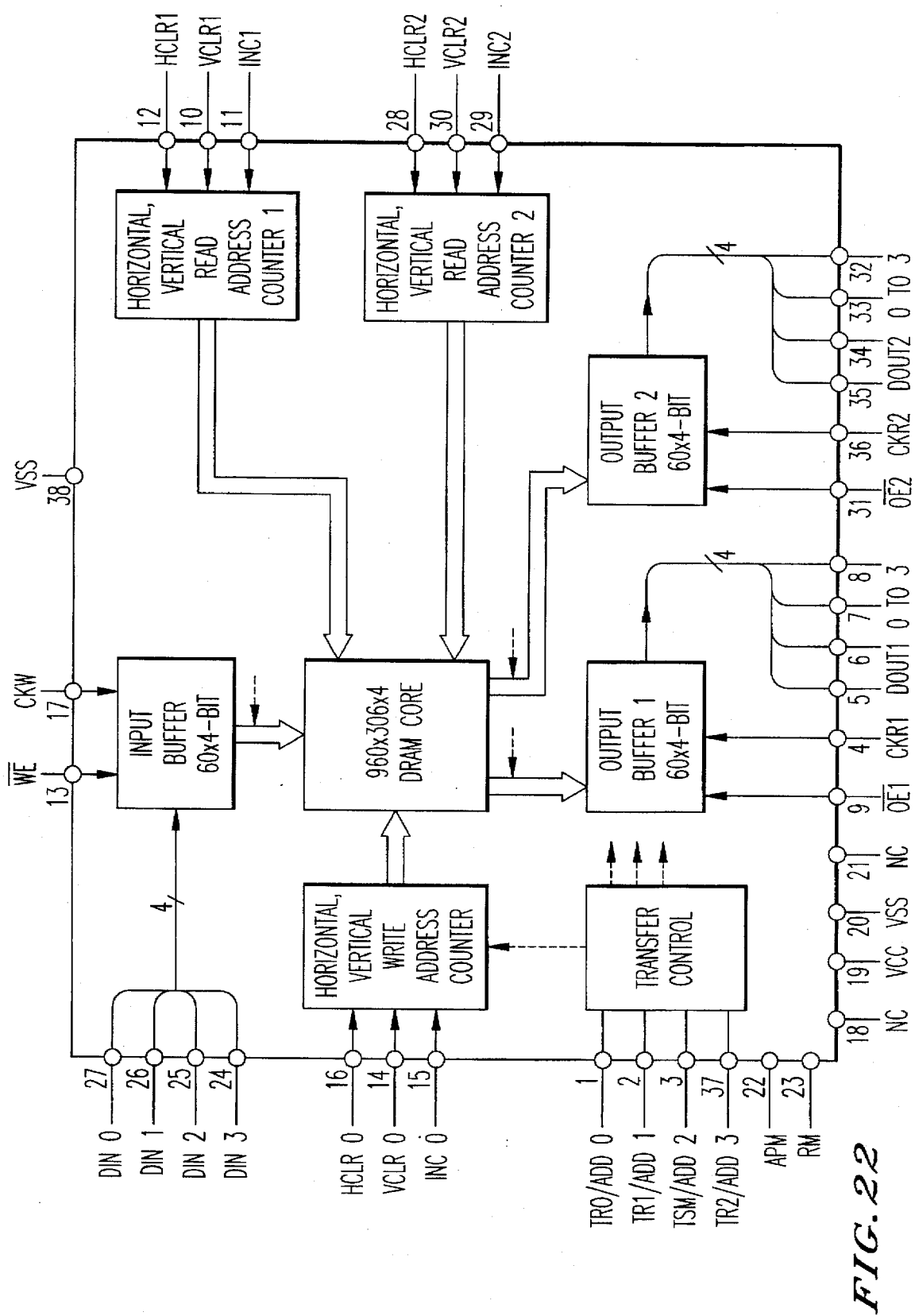
FIG. 22 shows an internal structure of a three-part video memory.

FIG. 22 is a block diagram showing the internal structure of the three-port video memory 310, which is originally shown in page 2 of the data sheet No. 71215-ST of the CXK1206 of SONY. The three-port video memory includes a DRAM core of 960 columns×306 rows×4 bits, an input buffer of 60×4-bit, two output buffers of 60×4-bit, a horizontal/vertical write address counter, a transfer control, and two horizontal/vertical read address counters. It is apparent from FIG. 22 that video signals supplied to input terminals DinO-3 are temporarily stored in the input buffer before being written into the DRAM core, and that video signals read out of the DRAM core are temporarily stored in one of the output buffers before being output from output terminals Dout1 or Dout2. The video signals output from the output terminal Dout1 are transferred to the D-A converter 410 while the video signals output from the output terminal Dout2 are transferred to the microprocessor 620 through the FIFO memory 360, the read control unit 350, and the microprocessor bus 360 (FIG. 4).

In the three-port video memory 310: a memory drive clock signal HDCK is inputted to a port-1 shift signal CKR1; a memory vertical/horizontal reset signal MRST is inputted to a port-1 vertical clear VCLR1; a horizontal reset signal HRST is inputted to a port-1 horizontal clear HCLR1; a vertical offset signal VOFT or a vertical line clock signal VLCK is inputted to a port-1 line increment INC1; and a port-1 output enable RE1 (i.e., negative logic) is inputted to a port-1 output enable RE1 (i.e., negative logic).

Moreover, the luminance signal LSMEM is read out from port-1 data outputs $DO_{10}$ to $DO_{13}$.

The luminance signal LSMEM having its read controlled by those port-1 shift signal CKR1, port-1 vertical clear signal VCLR1, port-1 horizontal clear signal HCLR1 port-1 line increment signal INC1, port-1 output enable RE1 (i.e., negative logic) and port-1 data outputs $DO_{10}$ to $DO_{13}$ is a dichroic luminance signal having 4 bits, i.e., sixteen gradations.

Here, it is needless to say that the luminance signal having 4 bits or more or the color luminance signal could likewise be processed.

In FIG. 14: reference numeral 310 designates a three-port video memory for storing the luminance signal LSMEM; numeral 410 designates a DAC for converting the luminance signal LSMEM to analog prior to outputting luminance signal LSDA; numeral 510 designates a video switch for outputting the input at a point A or B from a common point C in response to a change-over signal CNT inputted to the change-over input terminal; numeral 620 designates a CPU for outputting the horizontal synchronizing signal HSPC or the vertical synchronizing signal VSPC; numeral 610 designates a CPU bus; numeral 421 designates a horizontal reference read dot clock generator for outputting a horizontal reference read dot clock signal HBDCK; numeral 422 designates a horizontal read starting counter for outputting a horizontal read starting A signal HRSA and a horizontal read direction reset signal HRST; numeral 423 designates a horizontal 64-clock counter for outputting a horizontal read starting B signal HRSB; numeral 424 designates a horizontal read number counter for outputting a horizontal read number signal HRT; numeral 425 designates a horizontal read dot clock generator for outputting a horizontal read dot clock signal HDDA; Numeral 426 designates a memory vertical read offset counter having a function capable to set the count number of the horizontal reference read dot clock generator 421 at will by the CPU 620 to output a vertical read offset signal VROFT; numeral 427 designates a vertical blanking number counter for outputting vertical blanking ending signal; numeral 428 designates a vertical read starting counter for outputting a vertical read starting signal VRS; numeral 429 designates a vertical read number counter for outputting a vertical read number signal VRT; numeral 430 designates a vertical read line clock generator for outputting a vertical read line clock signal VRLCK; numeral 431 designates an AND circuit for outputting a superimpose starting signal; numeral 432 designates an OR circuit for outputting either a vertical read offset signal VROFT or a vertical read line increment signal VRLCK as a vertical read clear signal VCLR1; numeral 483 designates a NOR circuit for outputting a read enable signal HE1; numerals 434 and 438 designate tri-state circuits; and numeral 436 designates an inverter circuit.

The luminance signal LSPC outputted by the personal computer is inputted to the point A of the video switch 510.

Moreover, the horizontal synchronizing signal HSPC is inputted to the horizontal reference read dot clock generator 421, the horizontal read starting counter 422, the horizontal 64-clock counter 423, the horizontal read number counter 424, the horizontal read dot clock generator 425, the vertical blanking number counter 427, the vertical read starting counter 428, the vertical read number counter 429, the vertical read line clock generator 430 and the (not-shown) personal computer monitor.

The horizontal read starting counter 422, the horizontal 64-clock counter 423 and the horizontal read number counter 424 have their individual count values reset by the horizontal synchronizing signal HSPC.

Moreover, the vertical synchronizing signal VSPC is inputted to the port-1 vertical clear VCLR1 of the three-port video memory 310, the NOR circuit 433, the vertical read offset counter 426, the vertical blanking number counter 427, the vertical read starting counter 428, the vertical read number counter 429, the vertical read line clock generator 430 and the personal computer monitor.

The vertical read offset counter 426, the vertical blanking number counter 427, the vertical read starting counter 428 and the vertical read number counter 429 have their individual count values reset by the vertical synchronizing signal VSPC.

The horizontal reference read dot clock generator 421 is constructed of a PLL circuit, which is synchronized with the horizontal synchronizing signal HSPC to output a signal having a frequency several hundreds times as high as that of the horizontal synchronizing signal HSPC, to output the horizontal reference read dot clock signal HBDCK corresponding to the horizontal dot clock signal of the personal computer monitor.

The horizontal reference read dot clock signal HBDCK is outputted as the clock signal HDCK of the three-port video memory 310 to the port-1 shift signal terminal CKR1 of the three-port video memory 310 through the horizontal read starting counter 422, the horizontal 64-clock counter 423, the horizontal read number counter 424, the vertical read offset counter 426 and the tri-state circuit 435.

The vertical read dot clock generator 425 is constructed of a PLL circuit, which is synchronized with the horizontal synchronizing signal HSPC to output a signal having a frequency of $N_1$ times as high as that of the horizontal synchronizing signal HSFC, to output the horizontal read dot clock signal HDDA.

The horizontal read dot clock signal HDDA is outputted as the clock signal HDCK of the three-port video memory 310 through the tri-state circuit 434 to the port-1 shift signal terminal CKR1 of the three-port video memory 310 and the DAC 410 so that it is used as the read clock signal of the luminance signal LSMEM and the conversion clock signal of the DAC 410.

The vertical read line clock generator 430 is constructed of a PLL circuit, which is synchronized with the vertical synchronizing signal VSPC a signal having a frequency of $N_1$ times as high as that of the vertical synchronizing signal VSPC, output the vertical read line clock signal VRLCK.

The vertical read line clock signal VRLCK is synchronized with the clock signal HDCK of the three-port video memory 310 and is outputted to the port-1 output enable RE1 (i.e., the negative logic) through not only the port-1 line increment INC1, which is used to advance the line address, i.e., the vertical address of the three-port video memory 310 through the OR circuit 432, but also the OR circuit 432 and the NOR circuit 433.

The basic timings of the superimpose circuit 420 is obtained by those horizontal reference read dot clock signal HBDCK, horizontal read dot clock signal HDDA and vertical read line clock signal VRLCK.

In order to determine the read starting offset point of the three-port video memory 310, the vertical read offset counter 426 outputs the vertical offset signal VOFT for summing the vertical line addresses of the three-port video memory 310, while being synchronized with the horizontal reference read dot clock signal HBDCK, after the counted value has been reset by the vertical synchronizing signal VSPC.

The vertical blanking number counter 427 outputs the vertical blanking ending signal VBE when the (not-shown) counter for eliminating the vertical back porch region of the LSPC counts the clock number of the horizontal synchronizing signal HSPC so that the vertical back porch region is passed.

In response to the output of the vertical blanking ending signal VBE or the starting signal outputted from the vertical blanking number counter 427, the vertical read starting counter 428 counts the clock number of the horizontal synchronizing signal HSPC to output the vertical read starting signal VRS or the vertical read starting signal coming from the three-port video memory 310.

In response to the output of the luminance signal VRS or the starting signal outputted from the vertical read starting counter 428, the vertical read number counter 429 counts the clock number of the horizontal synchronizing signal HSPC to output the vertical read number signal VRT or the vertical read period coming from the three-port video memory 310.

This three-port video memory 310 is vertically controlled by the vertical read offset counter 426, the vertical blanking number counter 427, the vertical read starting counter 428 and the vertical read number counter 429.

Here, the clock number of the horizontal reference read dot clock signal HBDCK counted by the vertical read offset counter 426, the clock number of the horizontal synchronizing signal HSPC counted by the vertical blanking number counter 427, the clock number of the horizontal synchronizing signal HSPC counted by the vertical read starting counter 428, and the clock number of the horizontal synchronizing signal HSPC counted by the vertical read number counter 429 can be set at individual arbitrary values by the CPU 620.

Moreover, the horizontal read starting counter 422 counts the clock number of the horizontal reference read dot clock signal HBDCK, which is outputted by the horizontal reference read dot clock generator 421, to output the horizontal read starting A signal HRSSA or the horizontal read starting signal of the three-port video memory 310.

In response to the output of the horizontal read starting A signal HRSA or the starting signal outputted from the horizontal read starting counter 422, a horizontal 64 clock counter counts the clock number of the reference dot clock signal HBDCK, which is outputted from the horizontal reference read dot clock generator 421, to output the horizontal read starting B signal HRSB when the counted value reaches the 64 clocks or the characteristics at the time of the reading operation of the three-port video memory 310.

The horizontal read number counter 424 counts the clock number of the reference dot clock signal HBDCK, which is outputted from the horizontal reference read dot clock generator 421, to output the horizontal read number signal HRT or the horizontal reading period starting signal of the three-port video memory 310.

This three-port video memory 310 is horizontally controlled by the horizontal read starting counter 422, the horizontal 64 clock counter 192 and the horizontal read number counter 424.

Here, the clock number of the horizontal reference read dot clock signal HBDCK counted by the horizontal read starting counter 422 and the clock number of the reference dot clock signal HBDCK counted by the horizontal read number counter 424 can be set at individually arbitrary values by the CPU 620.

Next, the operations of the superimpose control unit 420 will be described with reference to FIGS. 15, 16, 17 and 18.

Figure 15:
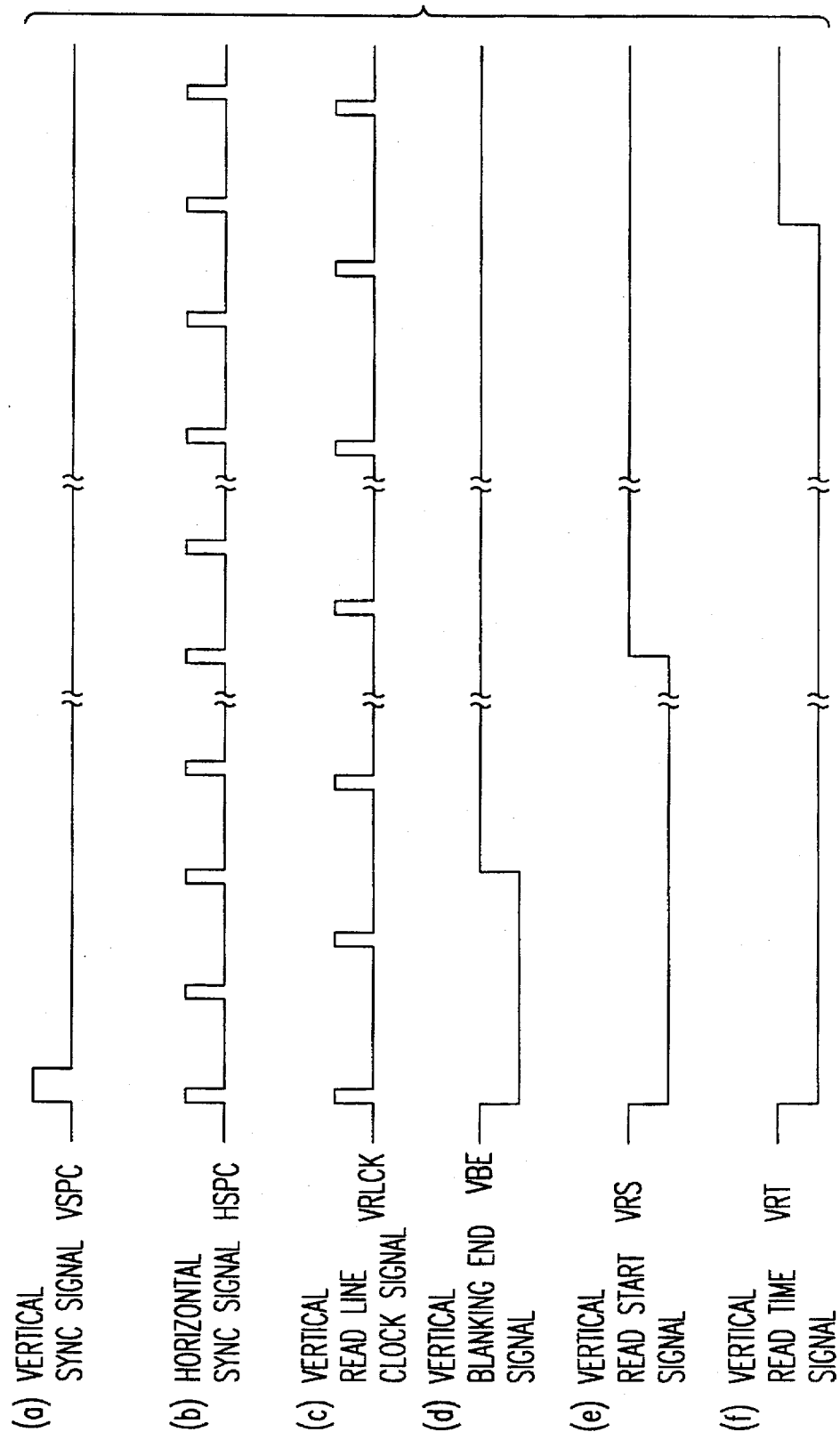
FIGS. 15, 16, 17 and 18 are timing charts showing the operations of the superimpose control unit shown in FIG. 14 and its peripheral circuits.
Figure 16:
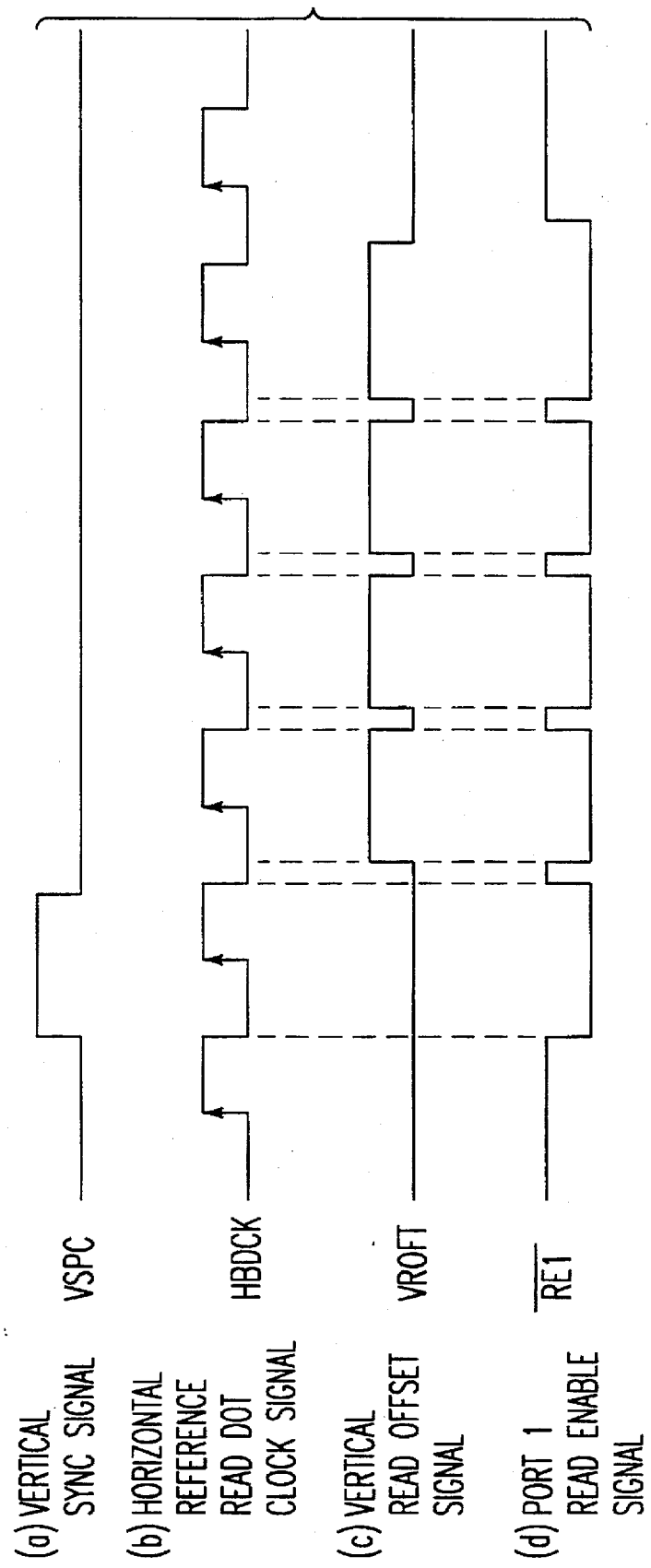
Figure 17:
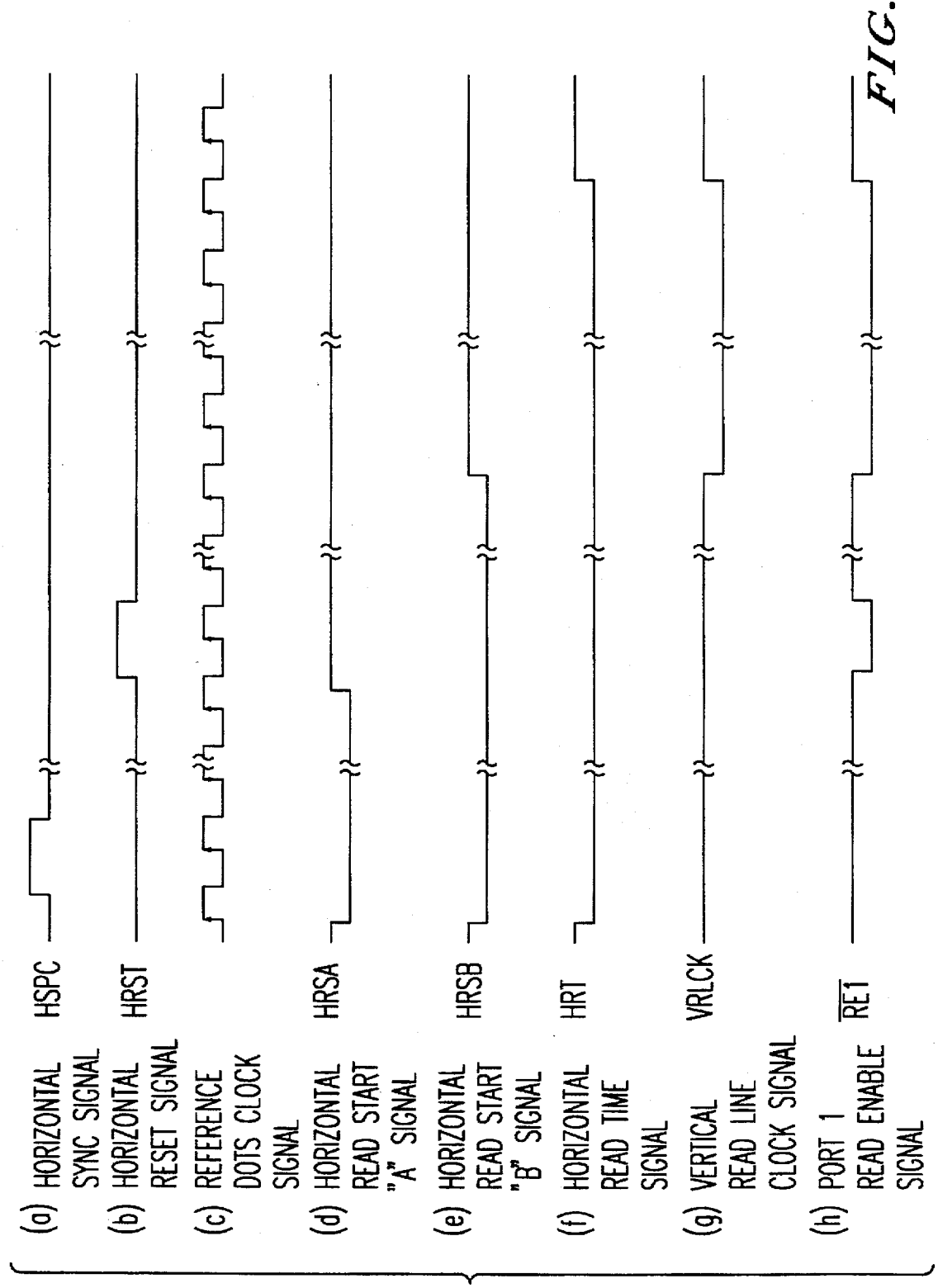
Figure 18:
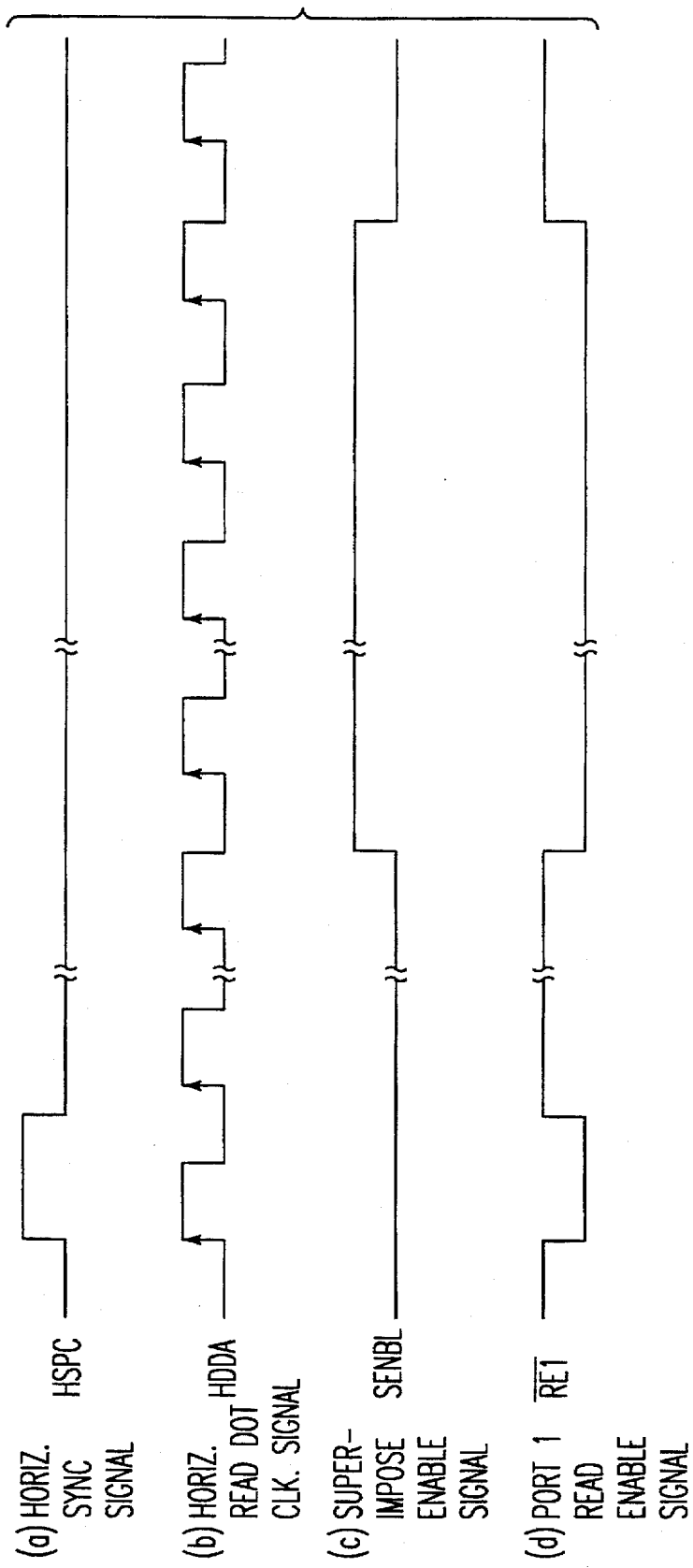

FIG. 15 is a time chart showing the vertical read starts of the three-port video memory 310; FIG. 16 is a timing chart showing the vertical offsets of the three-port video memory 310; and FIG. 17 is a timing chart showing the horizontal read starts of the three-port video memory 310. FIG. 18 is a timing chart showing the horizontal reads of the three-port video memory 310.

First of all, the vertical read starts of the three-port video memory 310 will be described in the following with reference to FIG. 15.

When the vertical synchronizing signal VSFC takes the high level "H" (as shown at (a) in FIG. 15), the vertical blanking number counter 427, the vertical read starting counter 428 and the vertical read number counter 429 are reset to drop the vertical blanking ending signal VBE, the vertical read starting signal VRS and the vertical read number signal VRT to the low level "L" (as shown at (d), (d) and (f) in FIG. 15). When the vertical blanking number counter 427 counts the clock number of the horizontal synchronizing signal HSPC to pass the vertical back porch region, the vertical blanking ending signal VBE is raised to the high level "H" (as shown at (d) in FIG. 15).

When the vertical blanking ending signal VBE takes the high level "H", the vertical read starting counter 428 starts to count the clock number of the horizontal synchronizing signal HSPC, When the vertical read starting counter 428 counts the set value of the CPU 620, the vertical read starting signal VRS is raised to the high level "H" (as shown at (e) in FIG. 15).

When the vertical read starting signal VRS takes the high level "H", the three-port video memory 310 is allowed to start the reading of the luminance signal LSMEM in the vertical direction so that the vertical read number counter 429 starts to count the clock number of the horizontal synchronizing signal HSPC.

When the vertical read number counter 429 counts the set value of the CPU 620, the vertical read number signal VRT is raised to the high level "H" (as shown at (f) in FIG. 15).

When the horizontal read starting B signal HRSB is at the high level "H" whereas the horizontal read number signal HRT is at the low level "L", the AND circuit 431 outputs the superimpose starting signal SENBL while the vertical reading starting signal VRS is at the high level "H" whereas the vertical read number signal VRT is at the low level "L".

On the basis of the horizontal read start, therefore, the three-port video memory 310 reads out the luminance signal LSMEM.

Next, the vertical offsets of the three-port video memory 310 will be described in the following with reference to FIG. 16.

When the vertical synchronizing signal VSPC takes the high level "H" (as shown at (a) in FIG. 16), the vertical read offset counter 426 is reset to start the counting of the clock number of the reference dot clock signal HBDCK.

The vertical read offset counter 426 outputs the vertical read offset signal VROFT, while counting the set value of the CPU 620, through the OR circuit 432 to the port-1 line increment INC1 of the three-port video memory 310 (as shown at (c) in FIG. 16) to offset the three-port video memory 310 vertically.

Since, at this time, the vertical synchronizing signal VSPC and the vertical read offset signal VROFT are inputted to the NOR circuit 433, the read enable signal RE1 (i.e., the negative logic) is also outputted to the read enable HE1 (i.e., the negative logic) of the three-port video memory 310.

Next, the horizontal read starts of the three-port video memory 310 will be described in the following with reference to FIG. 17.

When the horizontal synchronizing signal HSPC, the horizontal read starting counter 422, the horizontal 64-clock counter 423 and the horizontal read number counter 424 are reset to drop the horizontal read starting A signal HRSA, the horizontal read starting B signal HRSB and the horizontal read number signal HRT to the low level "L" (as shown at (d), (e) and (f) in FIG. 17).

When the horizontal read starting counter 422 counts the clock number of the reference dot clock signal HBDCK, which is outputted by the horizontal reference read dot clock generator 421, so that the counted value takes the set value of the CPU 620, it raises the horizontal read starting A signal HRSA to the high level "H" (as shown at (d) in FIG. 17).

When the horizontal read starting A signal HRSA takes the high level "H", the horizontal 64-clock counter 423 starts to count the clock number of the reference dot clock signal HBDCK. When this counted value reaches 64, the horizontal read starting B signal HRSB is raised to the high level "H" (as shown in FIG. (e) in FIG. 17).

Incidentally, the horizontal 64-clock counter 423 need not its value to 64 because this number is caused from the characteristics of the three-port video memory 310.

When the horizontal read starting B signal HRSB takes the high level "H", the horizontal read of the three-port video memory 310 is started so that the horizontal read number counter 424 starts the counting of the clock number of the reference dot clock signal HBDCK. When the counted value reaches the set value of the CPU 620, the horizontal read number signal HRT is raised to the high level "H" (as shown at (f) in FIG. 17).

When the vertical read starting signal VRS is at the high level "H" whereas the vertical read number signal VRT is at the low level "L", the AND circuit 431 outputs the superimpose starting signal SENBL at the high level "H" while the horizontal read starting B signal is at the high level "H" whereas the horizontal read number signal HRT is at the low level "L".

On the basis of the vertical read start, therefore, the three-port video memory 310 reads out the luminance signal LSMEM.

Next, the horizontal reading operations of the three-port video memory 310 will be described in the following with reference to FIG. 18.

The superimpose starting signal SENBL takes the high level "H" (as shown at (c) in FIG. 18), and the read enable signal RE1 shown is one when the luminance signal LSMEM is read out from the three-port video memory 310 and when the DAC 410 is subjected to the analog conversion on the basis of the horizontal read dot clock signal HDDAS outputted from the horizontal red dot clock generator 425 (as shown at (b) in FIG. 18).

The luminance signal LSPC of the personal computer is inputted to the point A of the video switch 510.

Moreover, the luminance signal LSDA read out from the three-port video memory 310 and converted to analog by the DAC 410 is inputted to the point B of the video switch 510.

As a result of the switching of the video switch 510, the luminance signal LSMON or the output of the video switch 510 is outputted as the luminance signal LSMON corresponding to the image, which is formed by superimposing the image corresponding to the analogly converted luminance signal LSDA upon the image corresponding to the luminance signal LSPC outputted from the personal computer.

Together with the output of the luminance signal LSMON, the horizontal synchronizing signal HSPC and the vertical synchronizing signal VSPC are also outputted to the personal computer monitor.

Incidentally, the timing charts thus far described are presented merely as one example, and the aforementioned operations can be achieved no matter whether the individual signals might be positive or negative logics.

As shown in FIG. 14, on the other hand, when the superimpose starting signal SENBL at the high level "H" is outputted through the NOT circuit 436 to the tri-state circuit 434, this tri-state circuit 434 operates to output the horizontal read dot clock signal HDDA as the drive clock signal HDCK. When the superimpose starting signal SENBL is at the low level "L", the tri-state circuit 435 operates to output the reference dot clock signal HBDCK as the drive clock signal HDCK.

By using the superimpose control unit 420 in the intelligent terminal and home TV set, according to the present invention, the image of the TV telephone or the interphone can be easily superimposed to realize monitorless TV telephone or interphone. Thus, one step is advanced to realize a new software computer, in which the image can be freely controlled in the computer, such as a baseball game capable of being enjoyed on a common monitor while operating the word processor in the personal computer TV, an educational program on a real video by the CAI, stress preventing measures for the VDT workers, or a monitor system using motion pictures on the computer.

Figure 19:
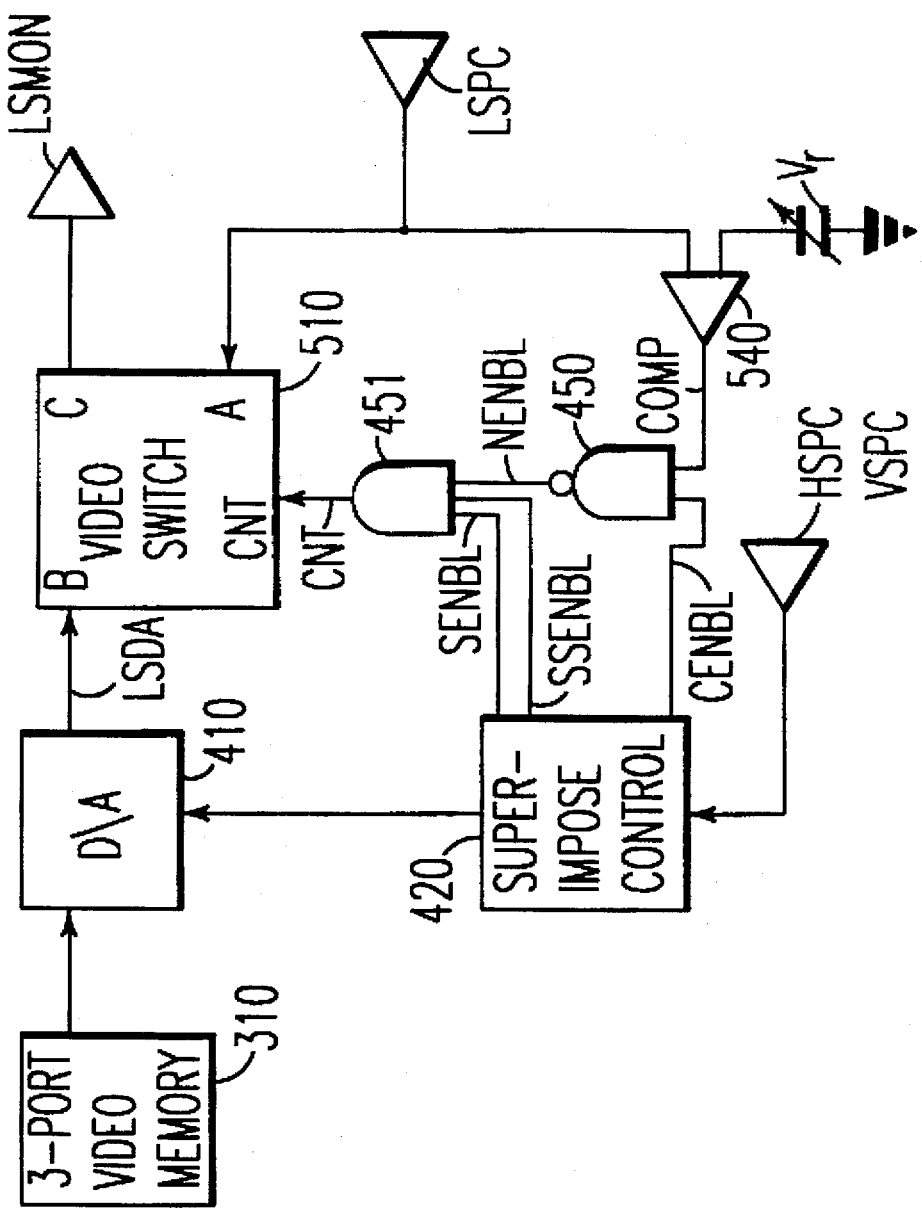
FIG. 19 is a circuit diagram showing a multiplex superimpose control unit.

Next, FIG. 19 is a block diagram showing a circuit for multiplex-superimposing the luminance signal.

The luminance signal LSPC outputted from the personal computer is outputted to the video switch 510 and the voltage comparator 540.

This voltage comparator 540 outputs comparison signals COMP at the high level "H" and at the low level "L", respectively, when the luminance signal LSPC is higher and lower than the reference voltage $v_r$.

On the other hand, the superimpose control unit 420 outputs the starting signal CENBL for making the comparison signal COMP effective to the NAND circuit 450.

This NAND circuit 450 outputs the starting signal NENBL at the low level "L" only when the comparison signal COMP is at the high level "H" and the starting signal CENBL is at the high level "H".

An AND circuit 451 is fed with: the starting signal read out from the three-port video memory 310 for starting the superimpose of the luminance signal LSDA converted by the DAC 410 upon the luminance signal LSPC; the starting signal SSENBL for starting the superimpose of the luminance signal LSDA upon the luminance signal LSPC; and the starting signal NENBL outputted from the NAND circuit 450.

In response to the change-over signal CNT outputted from the AND circuit 451, the video switch 510 superimposes the video signal LSDA upon the luminance signal LSPC.

If the level of the luminance signal LSPC is generated when the luminance signal LSDA is superimposed upon the luminance signal LSPC, the Output signal COMP of the voltage comparator 540 takes the high level If, at this time, the superimpose control unit 420 outputs the starting signal CENBL to the NAND circuit 450, this NAND circuit 450 outputs the starting signal NENBL at the low level "L" so that the change-over signal CNT outputted from the AND circuit 451 takes the low level "L" only for the period of the level time of the luminance signal LSPC.

As a result, the luminance signal LSPC in the luminance signal LSDA is superimposed upon the luminance signal LSMON of the personal computer monitor.

Figure 20:
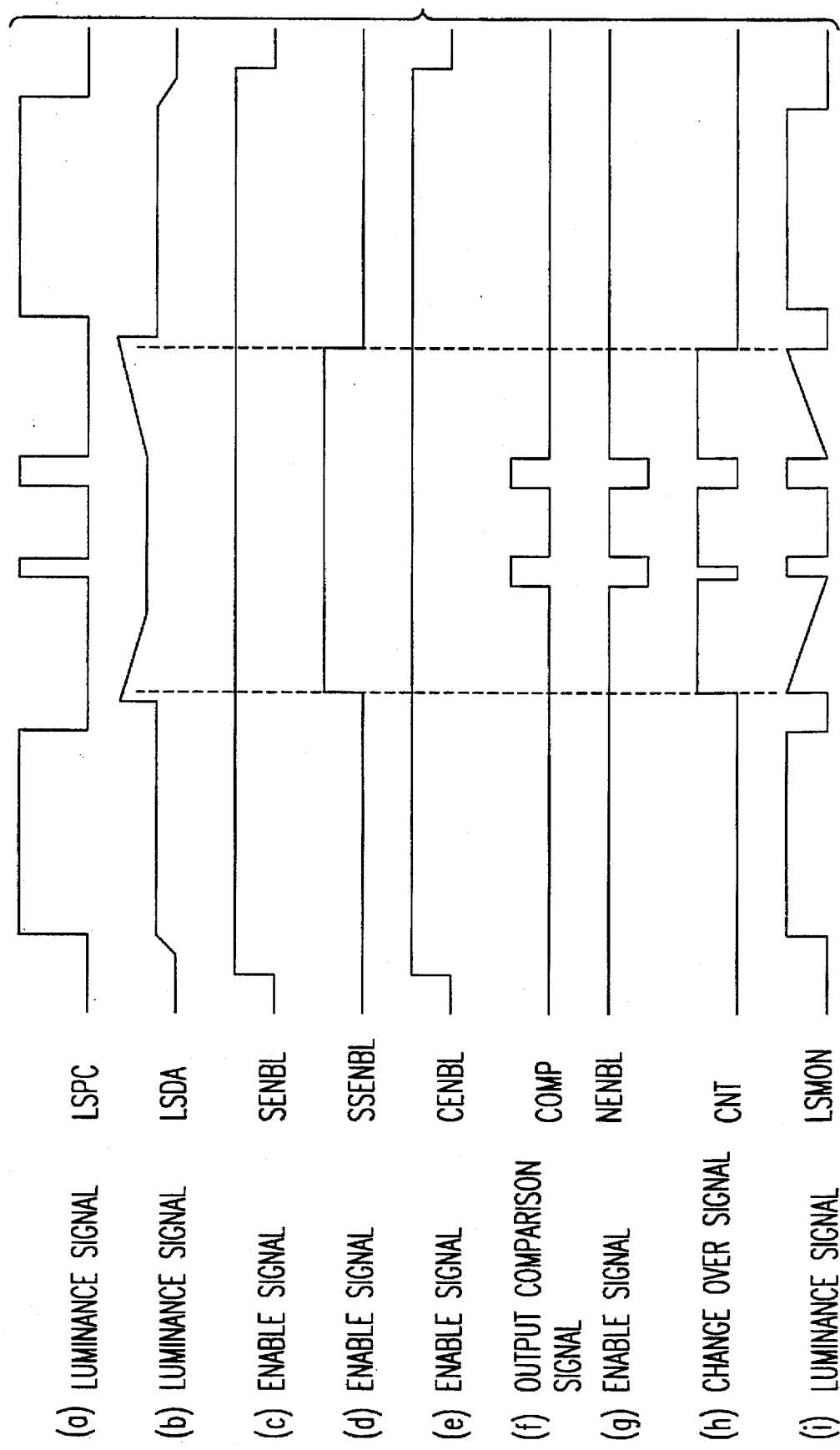
FIG. 20 is a timing chart showing the operations of the multiplex superimpose control unit shown in FIG. 19.
Figure 21:
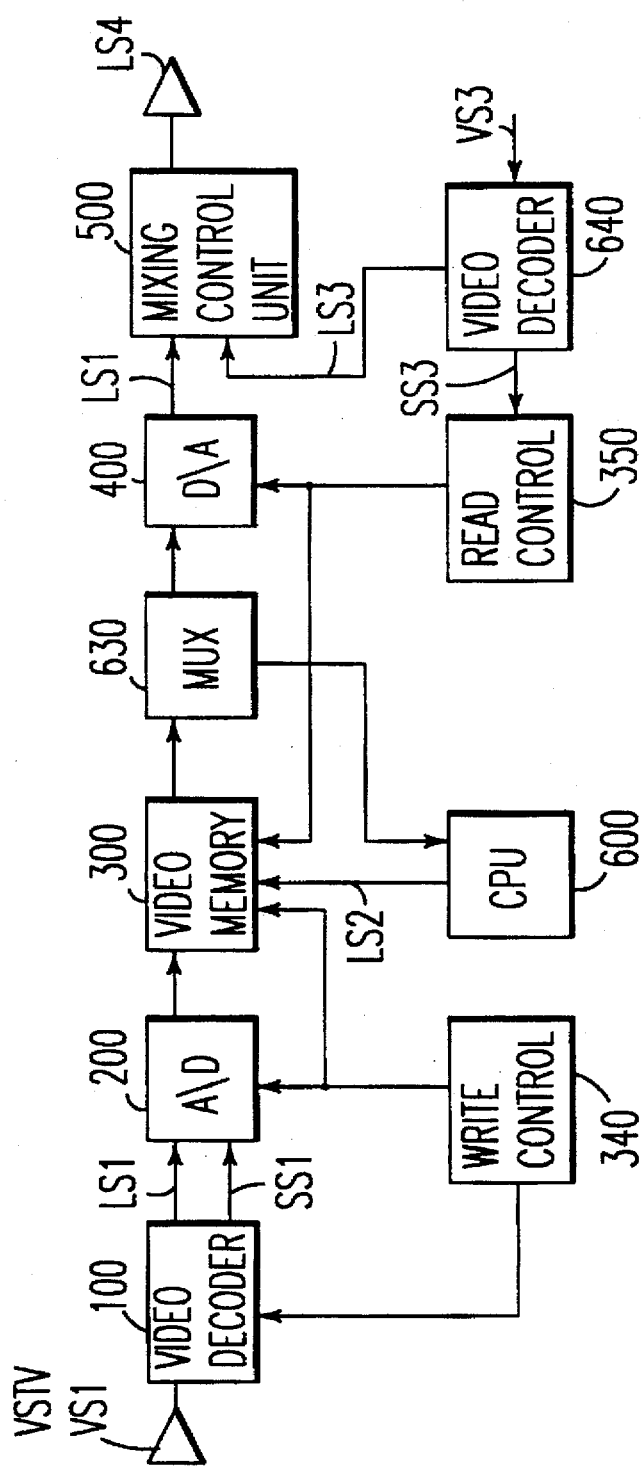
FIG. 21 is a block diagram showing the image processing system of the prior art.

FIG. 20 is a timing chart showing the operations of FIG. 19.

Incidentally, the starting signal SENBL and the starting signal CENBL are set at the high level "H".

The luminance signal LSMON (as shown at (i) in FIG. 20) of the personal computer monitor thus obtained is a superimposition of the luminance signal (as shown at (b) in FIG. 20) LSDA upon the luminance signal LSPC (as shown at (a) in FIG. 20) and a superimposition of letters or special shapes, which are formed from the luminance signal LSPC during the scanning of the luminance signal LSDA, upon the luminance signal LSDA.

Here, it is needless to say that the aforementioned operations can hold no matter whether the logics might be positive or negative.

Moreover, the AND circuit 451 and the NAND circuit 450 are circuits which can be easily realized for all the switches having the switching function such as the OR circuit, the multiplexer or the analog switch.

Although it is general to superimpose the luminance signal LSDA upon the luminance signal LSPC, it takes a remarkably long time to superimpose the luminance signal LSPC upon the luminance signal LSDA, and the superimposition is impossible in case the luminance signal LSDA relates to motion pictures.

In the present invention, however, the letters or special shapes to be displayed in the luminance signal LSDA are outputted to the luminance signal LSPC in the common position of the luminance signal LSDA so that the superimposition of the luminance signal LSDA is released only at the portion at the level of the luminance signal LSPC. This raises none of the problems of the prior art even in the motion pictures of the luminance signal LSDA and by a remarkably simple circuit. Therefore, the present invention is indispensable in the future image processing circuit.

Next, the operations in case the video still pictures are to be outputted will be described in the following.

The video signal decoder 140 outputs the vertical synchronizing signal VSTV from the luminance signal LSTV to an AND circuit 810. On the other hand, the CPU 620 outputs an ON/OFF signal for turning on and off the video still pictures to the AND circuit 810.

By outputting the ON/OFF signal at the low level "L" for turning on the still pictures to the AND circuit 810, the vertical synchronizing signal VSTV is not outputted from the video signal decoder 140 to the vertical write line clock generator 224, the vertical write starting counter 225, the vertical write number counter 226, the vertical offset counter 227 and the three-port video memory 310.

When the vertical synchronizing signal VSTV is not outputted, the vertical write line clock generator 224, the vertical write starting counter 225, the vertical write number counter 226, the vertical offset counter 227 and the three-port video memory 310 are not set up by the vertical synchronizing signal VSTV.

As a result, the three-port video memory 310 has its writing operation naturally interrupted because the vertical control system is not reset.

Thus, the CPU 620 can output the control signals of the still picture at any time to enter another job.

In case the still picture is to be turned off, on the other hand, the CPU 620 can output the control signals, if necessary, to the AND circuit 810. There will be required a high-speed processing, in which the CPU 620 performs multi-purpose jobs multiplexly, and a loss as high as several tens mS adversely affects the throughput or turn-round to raise a serious problem.

As a result, the simplified circuit structure according to the present invention can eliminate the loss of several tens mS.

What is claimed is:

1. An image control device for use in a computer system having a microprocessor, a bus coupled to said microprocessor, a video memory coupled to said bus, and a display device, said image control device comprising:

write control means coupled to said bus for controlling the writing of an image signal into said video memory by supplying a write address to said video memory;

a video switch for receiving a plurality of image signals including a first image signal read out of said video memory, and selecting one of said plurality of image signals; and read control means coupled to said bus for supplying said video switch with a first selection signal to instruct said selecting, and controlling the reading of said first image signal out of said video memory by supplying a read address to said video memory asynchronously with said writing into said video memory and in synchronism with a synchronizing signal which is to be supplied to said display device along with said image signal read out of said video memory;

wherein said read control means comprises:

means for changing a range of said read address according to a plurality of read address parameters set by said microprocessor so that a memory area of said video memory from which said image signal is to be read out is changed according to said range of said read address; and means for changing a size of an image represented by said image signal read out of said video memory.

2. An image control device in accordance with claim 1, wherein said write control means comprises:

means for changing a range of said write address according to a plurality of write address parameters set by said microprocessor so that a memory area of said video memory into which said image signal is to be written is changed according to said range of said write address; and means for changing a size of an image represented by said image signal to be written into said video memory.

3. An image control device in accordance with claim 2, further comprising:

an input buffer for temporarily storing said image signal to be written into said video memory.

4. An image control device in accordance with claim 3, further comprising:

a first output buffer, coupled to said video memory and said display device, for temporarily storing said image signal read out of said video memory before transferring said image signal to said display device; and a second output buffer, coupled to said video memory and said microprocessor, for temporarily storing said image signal read out of said video memory before transferring said image signal to said microprocessor.

5. A computer system comprising:

a microprocessor;

a bus coupled to said microprocessor;

a video memory coupled to said bus;

a display device;

write control means coupled to said bus for controlling the writing of an image signal into said video memory by supplying a write address to said video memory;

a video switch for receiving a plurality of image signals including a first image signal read out of said video memory, and selecting one of said plurality of image signals; and read control means coupled to said bus for supplying said video switch with a first selection signal to instruct said selecting, and controlling the reading of said first image signal out of said video memory by supplying a read address to said video memory asynchronously With said writing into said video memory and in synchronism with a synchronizing signal which is to be supplied to said display device along with said image signal read out of said video memory;

wherein said read control means comprises:

means for changing a range of said read address according to a plurality of read address parameters set by said microprocessor so that a memory area of said video memory from which said image signal is to be read out is changed according to said range of said read address; and means for changing a size of an image represented by said image signal read out of said video memory.

6. A computer system in accordance with claim 5, wherein said write control means comprises:

means for changing a range of said write address according to a plurality of write address parameters set by said microprocessor so that a memory area of said video memory into which said image signal is to be written is changed according to said range of said write address; and means for changing a size of an image represented by said image signal to be written into said video memory.

7. A computer system in accordance with claim 6, further comprising:

an input buffer for temporarily storing said image signal to be written into said video memory.

8. A computer system in accordance with claim 7, further comprising:

a first output buffer, coupled to said video memory and said display device, for temporarily storing said image signal read out of said video memory before transferring said image signal to said display device; and a second output buffer, coupled to said video memory and said microprocessor, for temporarily storing said image signal read out of said video memory before transferring said image signal to said microprocessor.

* * * * *

UNITED STATES PATENT AND TRADEMARK OFFICE
CERTIFICATE OF CORRECTION

PATENT NO. : 5,680,178
DATED : OCTOBER 21, 1997
INVENTOR(S) : KESATOSHI TAKEUCHI

It is certified that error appears in the above-indentified patent and that said Letters Patent is hereby corrected as shown below:

Please change the caption of element 140 in Figs. 4 and 8 and in the cover page "AUDIO SIGNAL SLCT" TO --VIDEO SIGNAL DECODER--.

Signed and Sealed this

Fourteenth Day of April, 1998

*Attest:*

BRUCE LEHMAN

*Attesting Officer*  *Commissioner of Patents and Trademarks*